(12) United States Patent
Nakamura et al.

(10) Patent No.: US 6,996,053 B2
(45) Date of Patent: Feb. 7, 2006

(54) OPTICAL RECORDING MEDIUM, OPTICAL REPRODUCTION APPARATUS, AND OPTICAL REPRODUCTION METHOD

(75) Inventors: Atsushi Nakamura, Osaka (JP); Mamoru Shoji, Osaka (JP); Takashi Ishida, Kyoto (JP); Junichi Minamino, Nara (JP); Yoshiharu Kobayashi, Osaka (JP); Hiromichi Ishibashi, Osaka (JP); Shigeru Furumiya, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 563 days.

(21) Appl. No.: 10/181,754

(22) PCT Filed: Jan. 23, 2001

(86) PCT No.: PCT/JP01/00422

§ 371 (c)(1),
(2), (4) Date: Sep. 30, 2002

(87) PCT Pub. No.: WO01/54119

PCT Pub. Date: Jul. 26, 2001

(65) Prior Publication Data

US 2003/0076758 A1    Apr. 24, 2003

(30) Foreign Application Priority Data

Jan. 24, 2000  (JP) .............................. 2000-014494
Oct. 10, 2000  (JP) .............................. 2000-308754

(51) Int. Cl.
G11B 5/09    (2006.01)
G11B 7/24    (2006.01)

(52) U.S. Cl. .............. 369/275.3; 369/47.21; 369/47.22; 369/53.41; 369/59.25

(58) Field of Classification Search ............ 369/275.1, 369/275.2, 275.3, 275.4, 47.1, 47.15, 47.21, 369/47.22, 47.27, 47.34, 53.1, 53.2, 59.1, 369/59.25
See application file for complete search history.

(56) References Cited

U.S. PATENT DOCUMENTS

5,602,823 A  *  2/1997  Aoki et al. .............. 369/275.3

FOREIGN PATENT DOCUMENTS

| JP | 09-161274 | 6/1997 |
| JP | 09-171623 | 6/1997 |
| JP | 09-251639 | 9/1997 |
| JP | 09-293244 | 11/1997 |

OTHER PUBLICATIONS

Chinese Office Action for corresponding Application 01804077.2, dated May 14, 2004.

* cited by examiner

*Primary Examiner*—Muhammad Edun
(74) *Attorney, Agent, or Firm*—Renner, Otto, Boiselle & Sklar, LLP

(57) ABSTRACT

An optical recording medium comprises a plurality of identifiers in association with address information, wherein: each identifier is provided on the optical recording medium; and each identifier comprises at least one of: a first pattern provided on the optical recording medium and representing a first code expressed by one bit; a second pattern provided on the optical recording medium and representing a second code expressed by one bit; and a third pattern provided on the optical recording medium and representing a third code expressed by one bit.

26 Claims, 14 Drawing Sheets

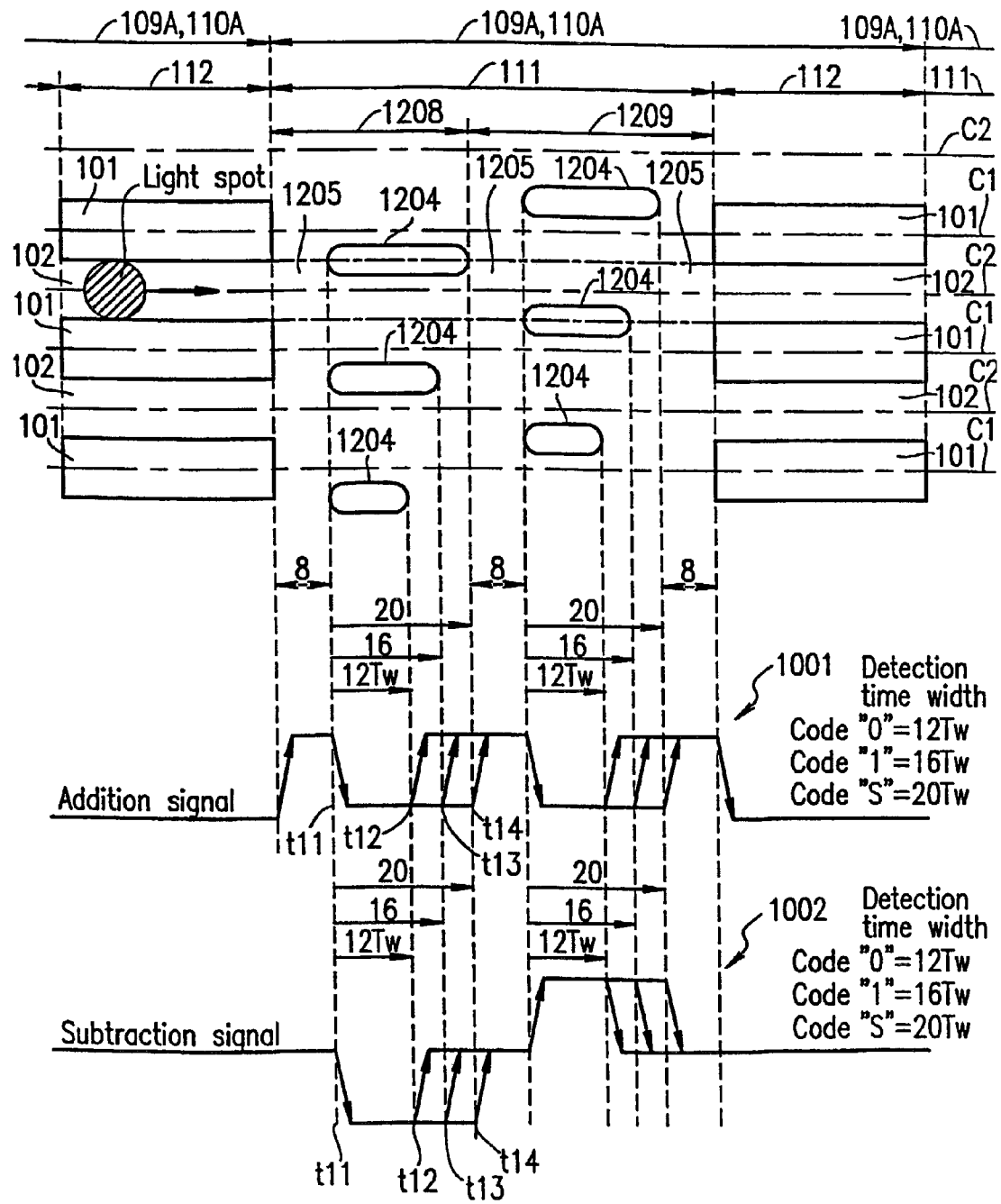

FIG. 11A
Structure of address information

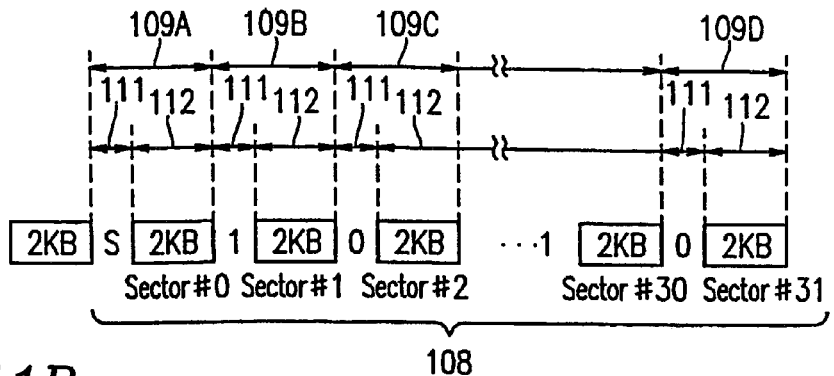

FIG. 11B
Content of address information

Single-layer disk

Address number = $\underbrace{S111000111\cdots0}_{\text{32 bits}}$ = 1 bit(S)+19 bits (address)+12 bits (parity)

Address space = $2^{19} \times 64\text{KB} = 32\text{GB}$

Two-layer disk

First recording layer
Address number = $\underbrace{S111000111\cdots\underset{\text{Layer-number bit}}{0}}$ 32 bits = 1 bit (S)+20 bits (address)+10 bits (parity)+1 bit (layer number)

Second recording layer
Address number = $\underbrace{S111000111\cdots\underset{\text{Layer-number bit}}{1}}$ 32 bits = 1 bit (S)+20 bits (address)+10 bits (parity)+1 bit (layer number)

Address space = $2^{20} \times 64\text{KB} = 64\text{GB}$

OPTICAL RECORDING MEDIUM, OPTICAL REPRODUCTION APPARATUS, AND OPTICAL REPRODUCTION METHOD

TECHNICAL FIELD

The present invention relates to an optical recording medium where a light beam is applied and converged onto the recording medium and light reflected from the recording medium is detected to reproduce information recorded in the recording medium.

Recently, optical disks have been commonly used for the purpose of storing video. There is a demand for high-density and high-speed optical disks capable of recording high-quality and long-play video. To meet such a demand, recording media need to have an even smaller structure. In addition, a reduction in size of a so-called overhead region is required. The overhead region, such as an address region, does not directly contribute to information capacity.

FIG. 13 is a diagram showing a configuration of tracks in a conventional disk which are irradiated by a light beam (see, for example, an optical disk having a DVD-RAM format as described in Nikkei Electronics, Oct. 20, 1997, pp. 167–186). In FIG. 13, 901 indicates a sector, i.e., an information unit, 902 indicates an identification information portion including address information which is recorded in the form of prepits upon manufacturing the optical disk and which cannot be rewritten, and 903 indicates a recording and reproduction portion to and from which information can be recorded and reproduced. The recording and reproduction portion 903 includes groove tracks 904, and land tracks 905 interposed between the groove tracks 904. Information can be recorded using the land tracks 905 and the groove tracks 904. The identification information portion 902 includes a header portion 906 and a mirror portion 907 which are recorded in the form of prepits upon manufacturing the optical disk and which cannot be rewritten.

The structure of one sector in the conventional optical disk will be described with reference to FIG. 14. In the optical disk, there are a series of sectors 901 which are minimal units for recording and reproduction. The sector 901 includes the identification information portion 902 and the recording and reproduction portion 903. The identification information portion 902 includes the header portion 906 having a length of 128 bytes and the mirror portion 907 having a length of 2 bytes. The length of the recording and reproduction portion 903 is 2567 bytes. A total of 2697 bytes of data are included in one sector 901. The recording and reproduction portion 903 includes a data portion 1007 into which data is recorded by a user, and attached portions 1006 and 1008 in which VFO (Variable Frequency Oscillator) is recorded. The VFO is used to attract PLL (Phase Locked Loop) required for reproducing the recorded user data.

In a conventional optical disk, positional information is recorded in the header portion 906 in order to recognize which sector of which part on the disk is tracked by a light beam. The positional information of the header portion 906 indicates the position of a sector 901 corresponding to that header portion 906. Specifically, a sector 901 specified by address "123456" has its header portion 906 in which the positional information "123456" is recorded.

The positional information has a length of 4 bytes. An error detection signal of 2 bytes is attached to the positional information in order to confirm whether the positional information is correctly reproduced. The positional information is recorded with the same density as that of the user data recorded in the recording and reproduction portion 903. Similar to the user data, the positional information must be reproduced using PLL. The positional information is recorded quadruply and has a total length of 128 bytes in order to enhance the reliability of computer peripheral devices employing the disk.

However, there are the following problems with the above-described conventional technology. For example, a conventional optical disk, in which user data of 2048 bytes is recorded in one sector, includes: the header portion 906 of 128 bytes, and the mirror portion 907 of 2 bytes for indicating a border between the header portion 906 and the recording and reproduction portion 903 so as to provide recognition of which sector of which part on the disk is tracked by a light beam; and the attached portion 1006 of 68 bytes and the attached portion 1008 of 81 bytes in order to record data in the recording and reproduction portion 903, to attract PLL, or to provide a spare region for recording data.

In the case of a DVD, recorded data itself is modulated for the purpose of error correction. When 8–16 modulation is performed, the data portion 1007 needs to have a size of 2418 bytes. Therefore, one sector needs to have a total size of 2697 bytes in order to record user data of 2048 bytes on a disk. In this case, the format efficiency of the disk is 2048/2697 (=0.759). That is, whereas 75.9% of the disk is utilized to record signals, 24.1% thereof is redundant.

For example, in the case where data having a size of 4.7 GB is recorded, a disk having a format efficiency of 75.9% has a greater amount of information per unit area compared with a disk having a format efficiency of 100%. For this reason, the former disk has less quality in recording and reproducing signals than the latter disk.

The present invention is provided to solve the above-described problems. The objective of the present invention is to provide an optical recording medium capable of recording a greater amount of data compared with a conventional disk having the same size, in which the redundancy of the header portions and the attached portions are reduced so that the optical recording medium is formatted with a higher format efficiency.

DISCLOSURE OF THE INVENTION

An optical recording medium according to the present invention comprises a plurality of identifiers in association with address information, wherein each identifier is provided on the optical recording medium; and each identifier comprises at least one of: a first pattern provided on the optical recording medium and representing a first code expressed by one bit; a second pattern provided on the optical recording medium and representing a second code expressed by one bit; and a third pattern provided on the optical recording medium and representing a third code expressed by one bit. Thereby, the above-described objective of the present invention is achieved.

The first code may include "0", the second code includes "1", and the third code includes "S" representing a synchronization mark.

Each identifier may include one or more prepits or marks provided on the optical recording medium and/or one or more spaces provided on the optical recording medium.

The first, second, and third patterns each may have a first prepit provided on the optical recording medium. The first and second patterns each may further have a second prepit and a first space between the first and second prepits, the first and second prepits and the first space being provided on the optical recording medium. The first prepit may have a length of P1, and the second prepit may have a length of P2. P1>P2 may be established in the first pattern, and P1<P2 may be established in the second pattern.

The first space may have a length of S1. P1=8×Tw, S1=4×Tw, and P2=4×Tw may be established in the first pattern, P1=4×Tw, S1=4×Tw, and P2=8×Tw may be established in the second pattern, and P1=16×Tw may be established in the third pattern, where Tw is a detection window width.

The third pattern may include: a fourth pattern including the first prepit and a second space disposed immediately after the first prepit, the second space being provided on the optical recording medium; and a fifth pattern including the first prepit and the second space disposed immediately before the first prepit.

The second space may have a length of S2. P1=12×Tw and S2=4×Tw may be established in the fourth and fifth patterns, where Tw is a detection window width.

The optical recording medium may include first and second information surfaces. The third code may include a code "S1" representing a first synchronization mark and recorded on the first information surface, and a code "S2" representing a second synchronization mark and recorded on the second information surface. The fourth pattern may represent the code "S1". The fifth pattern may represent the code "S2".

The first, second, and third patterns each may have a first space provided on the optical recording medium. The first and second patterns each may have a second space and a prepit between the first and second spaces, the second space and the prepit being provided on the optical recording medium. The first space may have a length of P1, and the second space may have a length of P2. P1>P2 may be established in the first pattern. P1<P2 may be established in the second pattern. The prepit may have a length of S1. P1=8×Tw, S1=4×Tw, and P2=4×Tw may be established in the first pattern, P1=4×Tw, S1=4×Tw, and P2=8×Tw may be established in the second pattern, and P1=16×Tw may be established in the third pattern, where Tw is a detection window width.

The first, second, and third patterns each may have a length of T1. The first pattern may include a first space and a first prepit disposed immediately after the first space, the first space and the first prepit being provided on the optical recording medium. The second pattern may include a second space and a second prepit disposed immediately after the second space, the second space and the second prepit being provided on the optical recording medium. The third pattern may include a third space and a third prepit disposed immediately after the third space, the third space and the third prepit being provided on the optical recording medium. The first, second, and third spaces may have respective lengths of P1, P2, and P3 being different from one another.

The length T1 may be equal to 24×Tw, the length P1 of the first space may be equal to 8×Tw, the length P2 of the second space may be equal to 12×Tw, and the length P3 of the third space is equal to 16×Tw, where Tw is a detection window width.

The first, second, and third patterns each may have a length of T1. The first pattern may include a first prepit and a first space disposed immediately after the first prepit, the first prepit and the first space being provided on the optical recording medium. The second pattern may include a second prepit and a second space disposed immediately after the second prepit, the second prepit and the second space being provided on the optical recording medium. The third pattern may include a third prepit and a third space disposed immediately after the third prepit, the third prepit and the third space being provided on the optical recording medium. The first, second, and third prepits may have respective lengths of P1, P2, and P3 being different from one another.

The length T1 may be equal to 24×Tw, the length P1 of the first prepit may be equal to 12×Tw, the length P2 of the second prepit may be equal to 16×Tw, and the length P3 of the third prepit may be equal to 20×Tw, where Tw is a detection window width.

The optical recording medium may include an address block including a plurality of sectors in association with the address information. Each sector may includes an identification information portion and a recording and reproduction portion. The identification information portion may include a header portion. One of the plurality of identifiers may be provided in the header portion.

The address information may represent an address of the address block. The address information may be recorded in the address block. The address information may be represented by a combination of the first, second, and third codes.

At least one header portion may include some of the plurality of identifiers.

The optical recording medium may include a plurality of zones having different numbers of identification information portions provided in a track round. Some of a plurality of sectors positioned at a border between each zone may be invalid regions, and information may not be allowed to be recorded in said some of the plurality of sectors. One of the plurality of identifiers provided in one of the identification information portions of each of said some of the plurality of sectors existing in the invalid region may include the third pattern representing the third code.

The optical recording medium may have a land and a groove, and the land and the groove may be in a form of concentric circles or a continuous spiral. Information may be recorded in the land and/or the groove. Each sector may include a land sector provided in the land and a groove sector provided in the groove.

The land and the groove may have a land track center line and a groove track center line, respectively. Each identifier may be disposed a predetermined distance from the land track center line or the groove track center line toward an inner or outer circumference side of the optical recording medium. Any two of the plurality of identifiers may not be symmetrical to each other with respect to the land track center line. Any two of the plurality of identifiers may not be symmetrical to each other with respect to the groove track center line.

One of the plurality of identifiers provided at the inner circumference side with respect to the groove track center line may be identical to another of the plurality of identifiers provided at the outer circumference side with respect to the groove track center line.

One of the plurality of identifiers provided at the inner circumference side with respect to the land track center line may be identical to another of the plurality of identifiers provided at the outer circumference side with respect to the land track center line.

The address information may include a parity bit.

The optical recording medium may include a plurality of information surfaces, and the address information includes a layer number for identifying each of the plurality of information surfaces.

An optical reproduction apparatus according to the present invention for reproducing information recorded in an optical recording medium comprising a plurality of identifiers in association with address information, wherein: each identifier is provided on the optical recording medium; and each identifier comprises at least one of: a first pattern provided on the optical recording medium and representing a first code expressed by one bit; a second pattern provided on the optical recording medium and representing a second code expressed by one bit; and a third pattern provided on the optical recording medium and representing a third code expressed by one bit, the apparatus comprises: a semiconductor laser for applying a light spot obtained by converging a light beam onto the optical recording medium; a light detection section for receiving the light beam reflected from the optical recording medium, and outputting a voltage signal corresponding to an amount of the reflected light beam; and an address detection section for detecting the address information based on the voltage signal output from the light detection section. Thereby, the above-described objective of the present invention is achieved.

An optical reproduction method according to the present invention for reproducing information recorded in an optical recording medium comprising a plurality of identifiers in association with address information, wherein: each identifier is provided on the optical recording medium; and each identifier comprises at least one of: a first pattern provided on the optical recording medium and representing a first code expressed by one bit; a second pattern provided on the optical recording medium and representing a second code expressed by one bit; and a third pattern provided on the optical recording medium and representing a third code expressed by one bit, the method comprises the steps of: applying a light spot obtained by converging a light beam onto the optical recording medium; receiving the light beam reflected from the optical recording medium, and outputting a voltage signal corresponding to an amount of the reflected light beam: and detecting the address information based on the voltage signal output from the light detection section. Thereby, the above-described objective of the present invention is achieved.

BRIEF DESCRIPTION OF THE DRAWINGS

FIG. 10 is a diagram showing a structure of an optical disk according to Example 7 of the present invention.

FIGS. 11A and 11B are diagrams used for explaining a structure of address information in an optical disk according to Example 8 of the present invention.

BEST MODE FOR CARRYING OUT THE INVENTION

EXAMPLE 1

Figure 1:
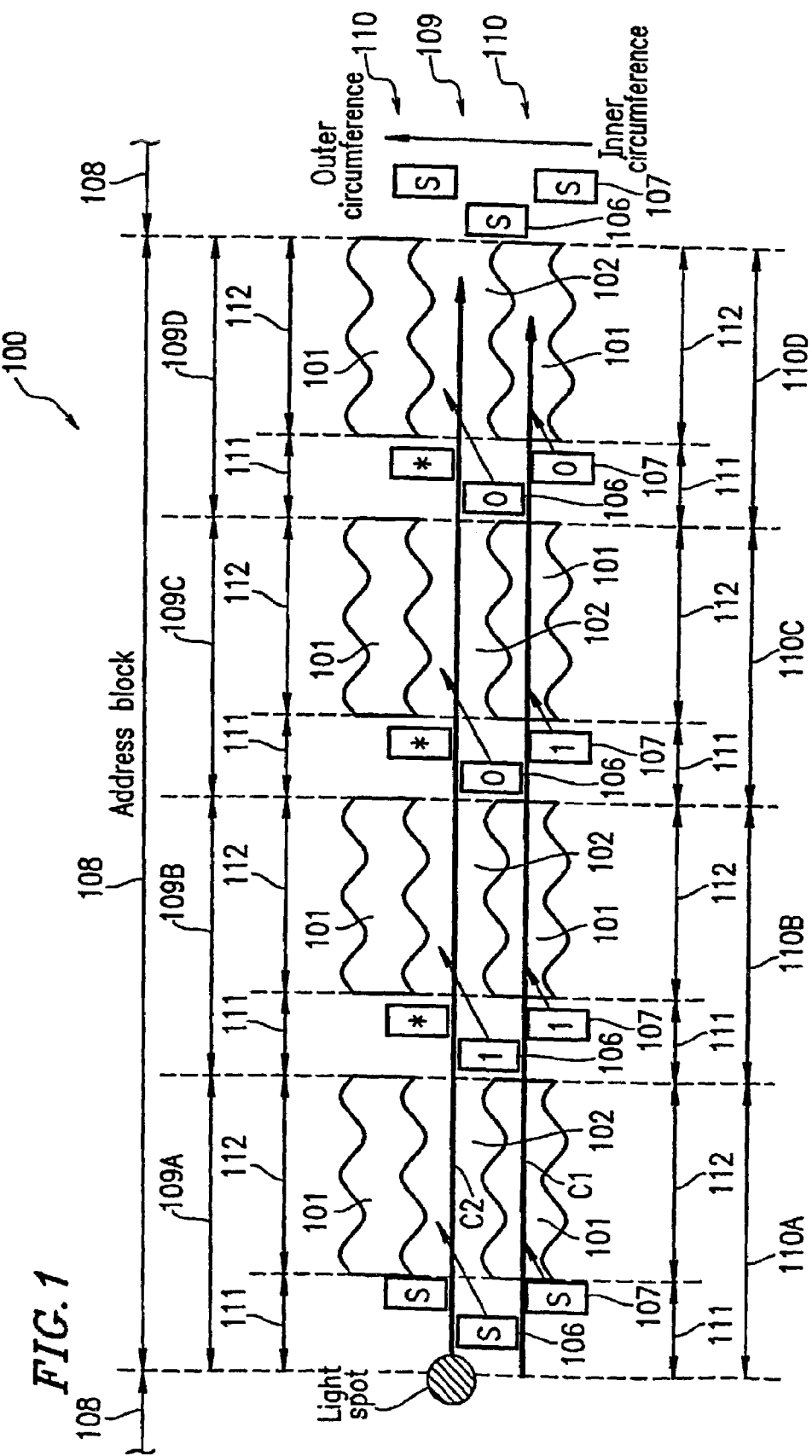
FIG. 1 is a diagram showing a structure of an optical disk according to Example 1 of the present invention.

Hereinafter, the present invention will be described by way of illustrative examples with reference to the accompanying drawings. FIG. 1 is a diagram showing the structure of an optical disk (optical recording medium) according to Example 1 of the present invention. FIG. 1 shows part of the structure of a track 100 which is in the form of concentric circles or a spiral on the disk.

Referring to FIG. 1, the track 100 includes a plurality of address blocks 108. One address block 108 includes a groove sector portion 110 and a land sector portion 109. The land sector portion 109 includes a plurality of land sectors 109A, 109B, 109C, and 109D. One groove sector portion 110 includes a plurality of grove sectors 110A, 110B, 110C, and 110D. Each of the land sectors 109A, 109B, 109C, and 109D includes an identification information portion 111 and a recording and reproduction portion 112. Each of the groove sectors 110A, 110B, 110C, and 110D includes an identification information portion 111 and a recording and reproduction portion 112.

A groove track 101 is provided in the recording and reproduction portion 112 Of each of the groove sectors 110A, 110B, 110C, and 110D. A land track 102 is provided in the recording and reproduction portion 112 of each of the land sectors 109A, 109B, 109C, and 109D. The groove track is a guide groove which has been previously formed in a spiral. The land track is a track interposed between the groove tracks.

In the identification information portion 111 of each of the land sectors 109A, 109B, 109C, and 109D, a first identifier (ID) 106 is recorded at a position shifted toward the inner circumference with respect to a center line C2 of the land track 102. In the identification information portion 111 of each of the groove sectors 110A, 110B, 110C, and 110D, a second identifier (ID) 107 is recorded at a position shifted toward the inner circumference with respect to a center line C1 of the groove track 101.

Address information indicating the position of the land sector portion 109 is distributed and assigned to the first identifiers 106 in the identification information portions 111 of the land sectors 109A, 109B, 109C, and 109D. Address information indicating the position of the groove sector portion 110 is distributed and assigned to the second identifiers 107 in the identification information portions 111 of the groove sectors 110A, 110B, 110C, and 110D.

In FIG. 1, a part of the address information indicating the position of the land sector portion 109 is assigned to the first identifiers 106 thereof, and a part of the address information indicating the position of the groove sector portion 110 is assigned to the second identifiers 107 thereof. Alternatively, a part of the address information indicating the position of the land sector portion 109 may be assigned to the second identifiers 107 thereof, and a part of the address information indicating the position of the groove sector portion 110 is assigned to the first identifiers 106 thereof.

The address information indicating the position of the land sector portion 109 is composed of the first identifiers 106 in the identification information portions 111 of the land sectors 109A, 109B, 109C, and 109D. In FIG. 1, the address information indicating the position of the land sector portion 109 is obtained by reading out the first identifiers 106 recorded in four successive land sectors 109A, 109B, 109C, and 109D. The address information indicating the position of the groove sector portion 110 is composed of the second identifiers 107 in the identification information portions 111 of the groove sectors 110A, 110B, 110C, and 100D. In FIG. 1, the address information indicating the position of the groove sector portion 110 is obtained by reading out the second identifiers 107 recorded in four successive groove sectors 110A, 110B, 110C, and 110D. A complete set of sectors constituting the address information is called an address block.

Next, the structure of the address information will be described with reference to FIG. 2. As an example, the address information indicating the position of the land sector portion 109 will be described. The structure of the address information indicating the position of the groove sector portion 110 is similar to the structure of the address information indicating the position of the land sector portion 109. As described above, the land sector portion 109 includes the land sectors 109A, 109B, 109C, and 109D. Each land sector 109A, 109B, 109C, and 109D includes the identification information portion 111 and the recording and reproduction portion 112.

In the identification information portion 111 of the land sector 109A, a pattern corresponding to a code "S" indicating synchronization is provided as a part of the address information. A position (sector starting position) from which the address block starts is identified by reading the pattern corresponding to the code "S".

In the identification information portion 111 of the land sector 109B, a pattern corresponding to a code "1" is provided as a part of the address information. In the identification information portion 111 of the land sector 109C, a pattern corresponding to a code "0" is provided as a part of the address information. In the identification information portion 111 of the land sector 109D, a pattern corresponding to a code "0" is provided as a part of the address information.

Figure 2:
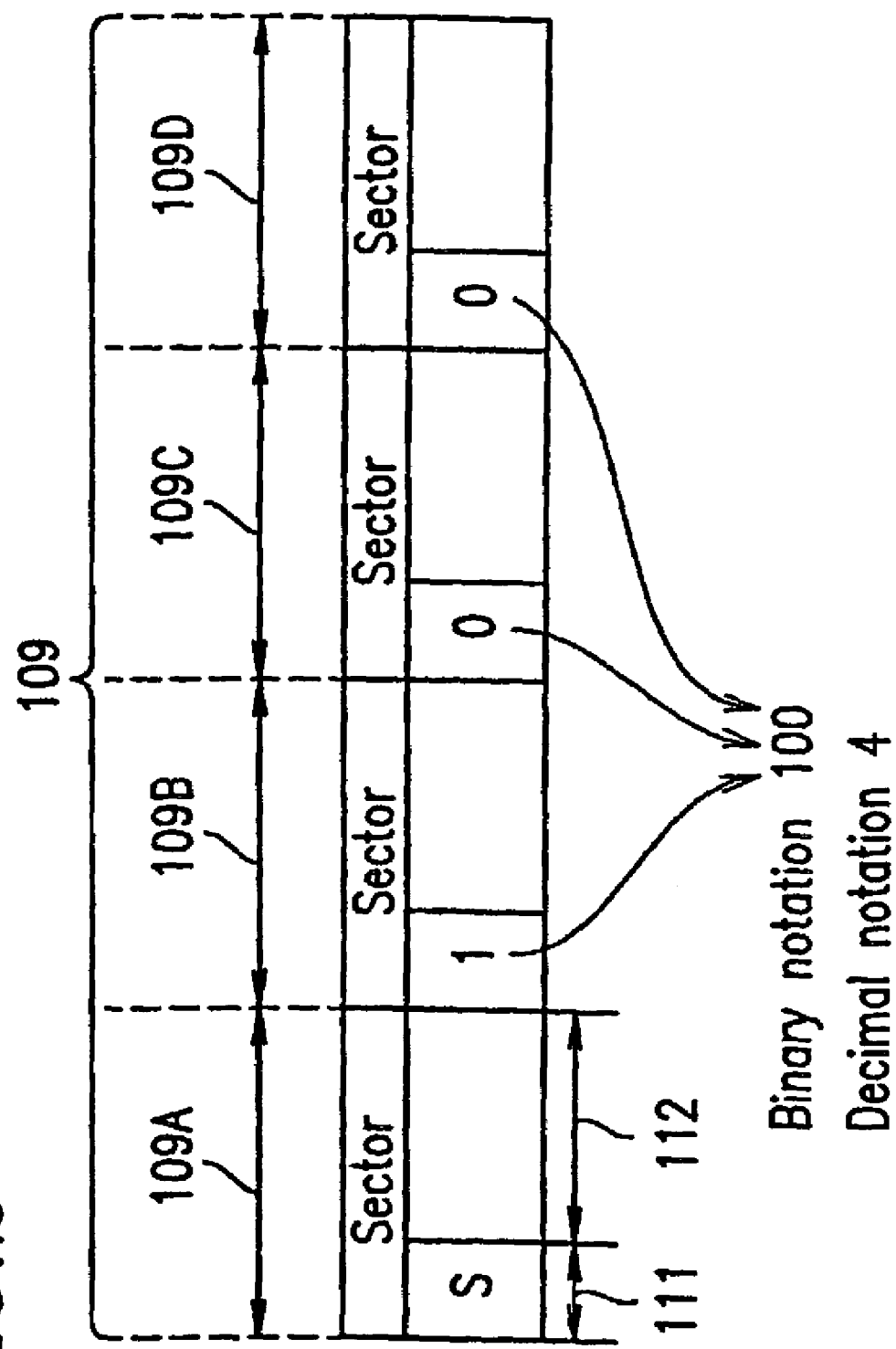
FIG. 2 is a diagram used for explaining a structure of address information in the optical disk of Example 1 of the present invention.

In FIG. 2, the four land sectors 109A, 109B, 109C, and 109D constitute one address block, and the codes "S", "1", "0", and "0" are successively recorded in the respective land sectors 109A, 109B, 109C, and 109D. Thus, for this address block, the address information indicating the position of the land sector portion 109 is collectively "S100". The identification code "S" indicates the starting position of the address information. The three codes of either "1" or "0" following the code "S" are binary information which essentially indicates the position of the land sector portion 109. For example, "S100" is "4" in decimal notation, i.e., the address indicating the position of the land sector portion 109 is identified as a fourth address.

The physical structure of a region in which the first identifier 106 is recorded will be described with reference to FIG. 3. A light spot 301 is moved upon scanning from left to right in FIG. 3. A first pattern 302 represents the code "0", a second pattern 303 represents the code "1", and a third pattern 304 represents the code "S".

The first pattern 302 representing the code "0" includes two prepits 305A and 305B, and a space 306 interposed therebetween. The prepits 305A and 305B have lengths of P1 and P2, respectively. The length P1 is 8 times as long as a detection window width Tw. The length P2 is 4 times as long as the detection window width Tw. A length S1 of the space 306 is 4 times as long as the detection window width Tw. In this case, the length P1 is greater than the length P2 (P1>P2), and S1 is equal to P2 (S1=P2).

The second pattern 303 representing the code "1" includes two prepits 305A and 305B, and a space 306 interposed therebetween. The prepits 305A and 305B have lengths of P1 and P2, respectively. The length P1 is 4 times as long as the detection window width Tw. The length P2 is 8 times as long as the detection window width Tw. The length S1 of the space 306 is 4 times as long as the detection window width Tw. In this case, the length P1 is less than the length P2 (P2>P1), and S1 is equal to P1 (S1=P1).

The third pattern 304 representing the code "S" includes a single prepit 305A. The prepit 305A has a length of P1. The length P1 is 16 times as long as the detection window width Tw.

The codes "0", "1", and "S" are defined based on the relationship in size between the length P1 and the length P2 in the following way:

(1) P1>P2: code "0",
(2) P1<P2: code "1", and
(3) P1 alone (P2=0): code "S".

In this case, the length P1 and the length P2 are 4Tw, 8Tw, or 16Tw, but are not limited to these length. The lengths P1 and P2 may be changed depending on the size of the light spot which is applied to the disk.

Upon reproduction, the codes are identified by judging the difference between the length P1 and the length P2 based on reproduced waveforms.

Figure 3:
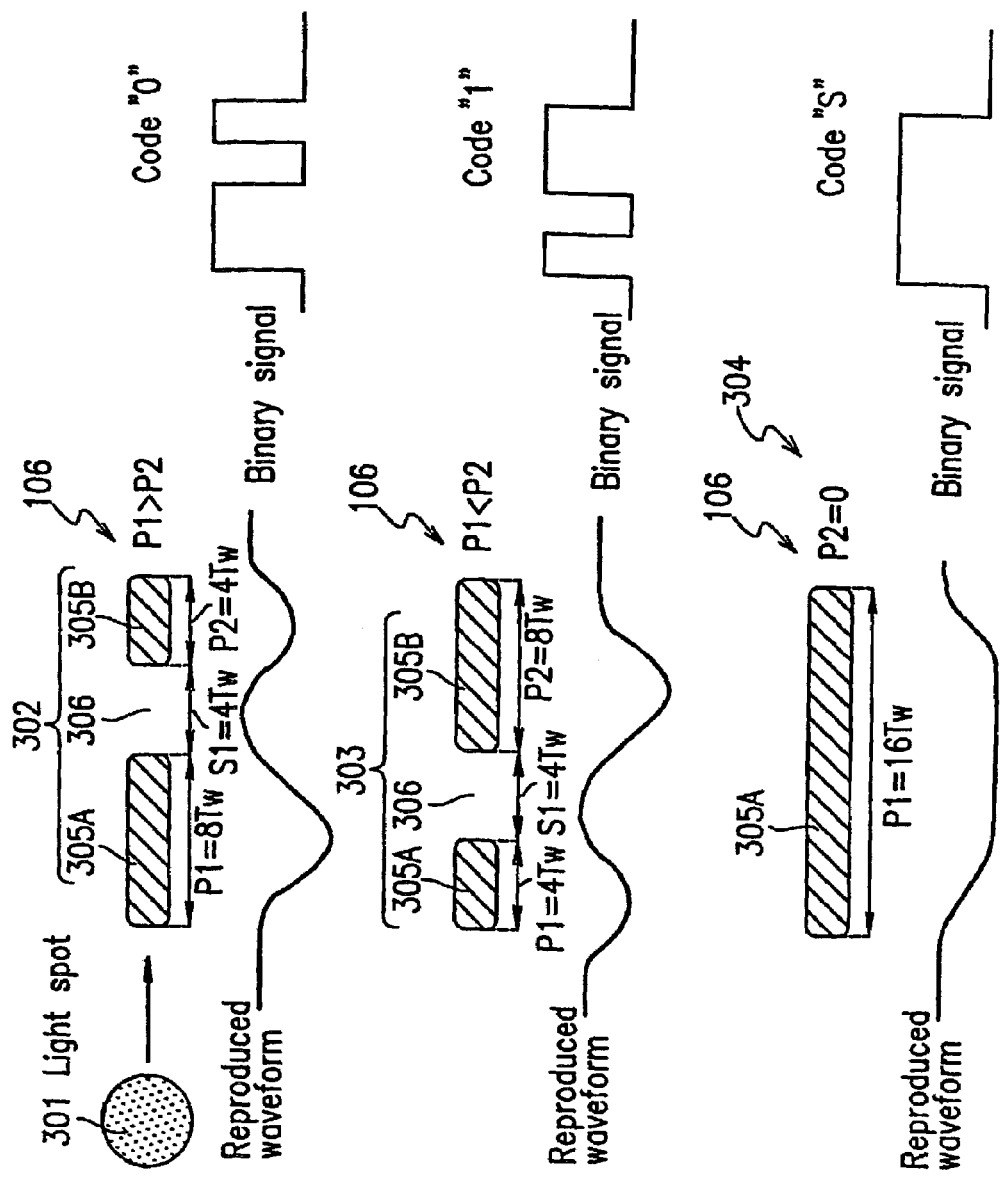
FIG. 3 is a diagram used for explaining a physical structure of ID of the optical disk of Example 1 of the present invention.

In FIG. 3, as an example, the physical structure of a region in which the first identifier 106 is recorded is described. The physical structure of a region in which one second identifier 107 is recorded is similar to the physical structure of the region in which the first identifier 106 is recorded.

The structure of an address block will be described with reference to FIG. 4. As described above, one address block 108 includes a land sector portion 109 and a groove sector portion 110. The land sector portion 109 and the groove sector portion 110 have the same structure. For the sake of simplicity, the structure of only the land sector portion 109 will be described as an example.

Figure 4:
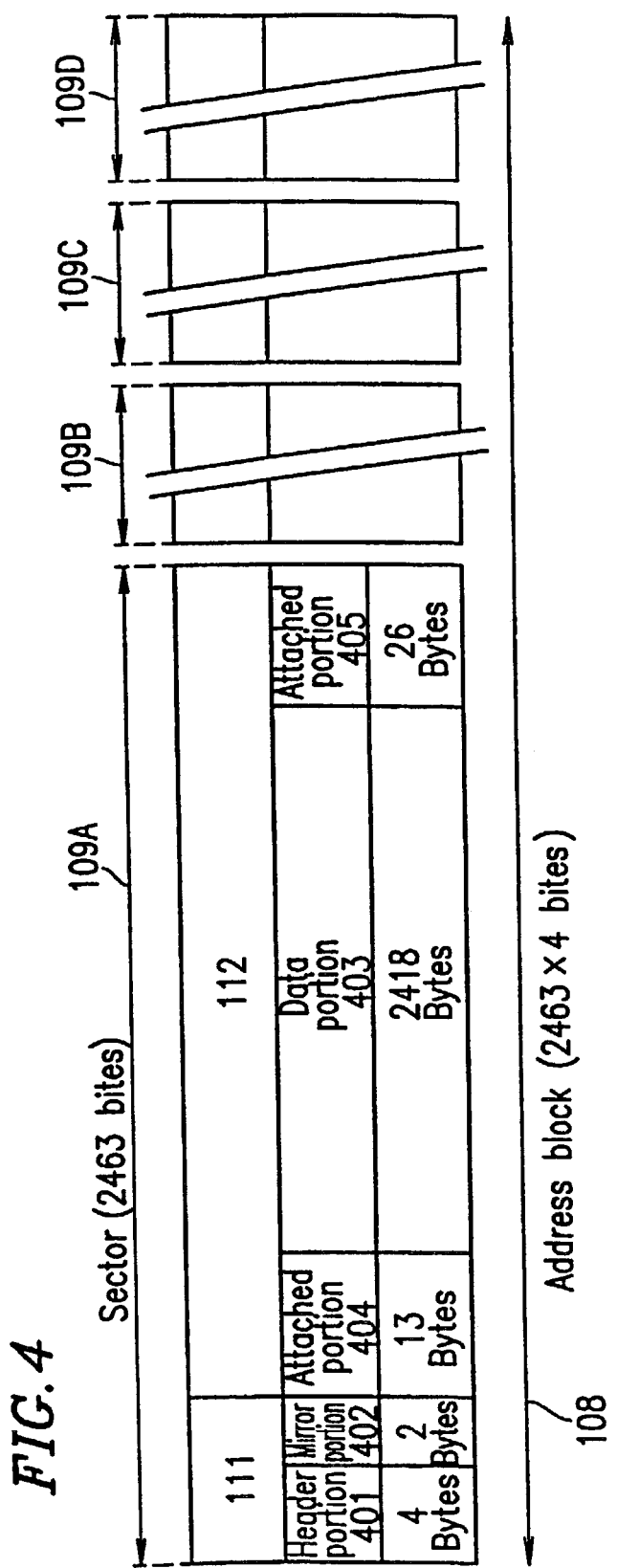
FIG. 4 is a diagram used for explaining a structure of an address block in the optical disk of Example 1 of the present invention.

Referring to FIG. 4, the land sector portion 109 includes the land sectors 109A, 109B, 109C, and 109D. The land sectors 109A, 109B, 109C, and 109D have the same structure. For the sake of simplicity, the structure of only the land sector 109A will be described as an example. The land sector 109A includes an identification information portion 111 and a recording and reproduction portion 112. The identification information portion 111 includes a header portion having a length of 4 bytes and a mirror portion 402 having a length of 2 bytes. The header portion 401 is composed of a prepit (or mark) and a space as shown in FIG. 3.

The recording and reproduction portion 112 includes a data portion 403 having a length of 2418 bytes, and attached portions 404 and 405 having respective lengths of 13 bytes and 26 bytes. In the data portion 403, 8×16-modulated data is recorded. The attached portions 404 and 405 each have a VFO (Variable Frequency Oscillator) region and a spare region (buffer). The VFO region is used to attract PLL (Phase Locked Loop) required for reproducing a signal recorded in the data portion 403.

When user data of 2048 bytes is recorded, one sector needs to have a total size of 2463 bytes including 6 bytes of the identification information portion 111 and 2457 bytes of the recording and reproduction portion 112. In this case, the format efficiency of a disk is 2048/2463 (=0.832). That is, whereas 83.2% of a disk is utilized to record signals, 16.8% thereof is redundant. This redundancy value is reduced by about 10% as compared to the redundancy 24.1% of the above-described conventional optical disk.

In Example 1, the combinations of two prepits and one space correspond to the codes "0", "1", and "S" in the regions in which the first and second identifiers 106 and 107 are recorded. Alternatively, a prepit and a space may be replaced with a space and a prepit, respectively. That is, combinations of two spaces and one prepit may correspond to the codes "0", "1", and "S" thereby obtaining the same effect.

As described above, two prepits (or marks) having the respective lengths P1 and P2 and one space having the length S1 are used to identify the codes in the first and second identifiers 106 and 107. Thus, the size of the header portion can be reduced to 4 bytes compared with the conventional header portion of 128 bytes. Thus, the formatted disk of the present invention has a header portion having a reduced redundancy, thereby increasing the recording capacity of the disk by a great amount.

EXAMPLE 2

Figure 5:
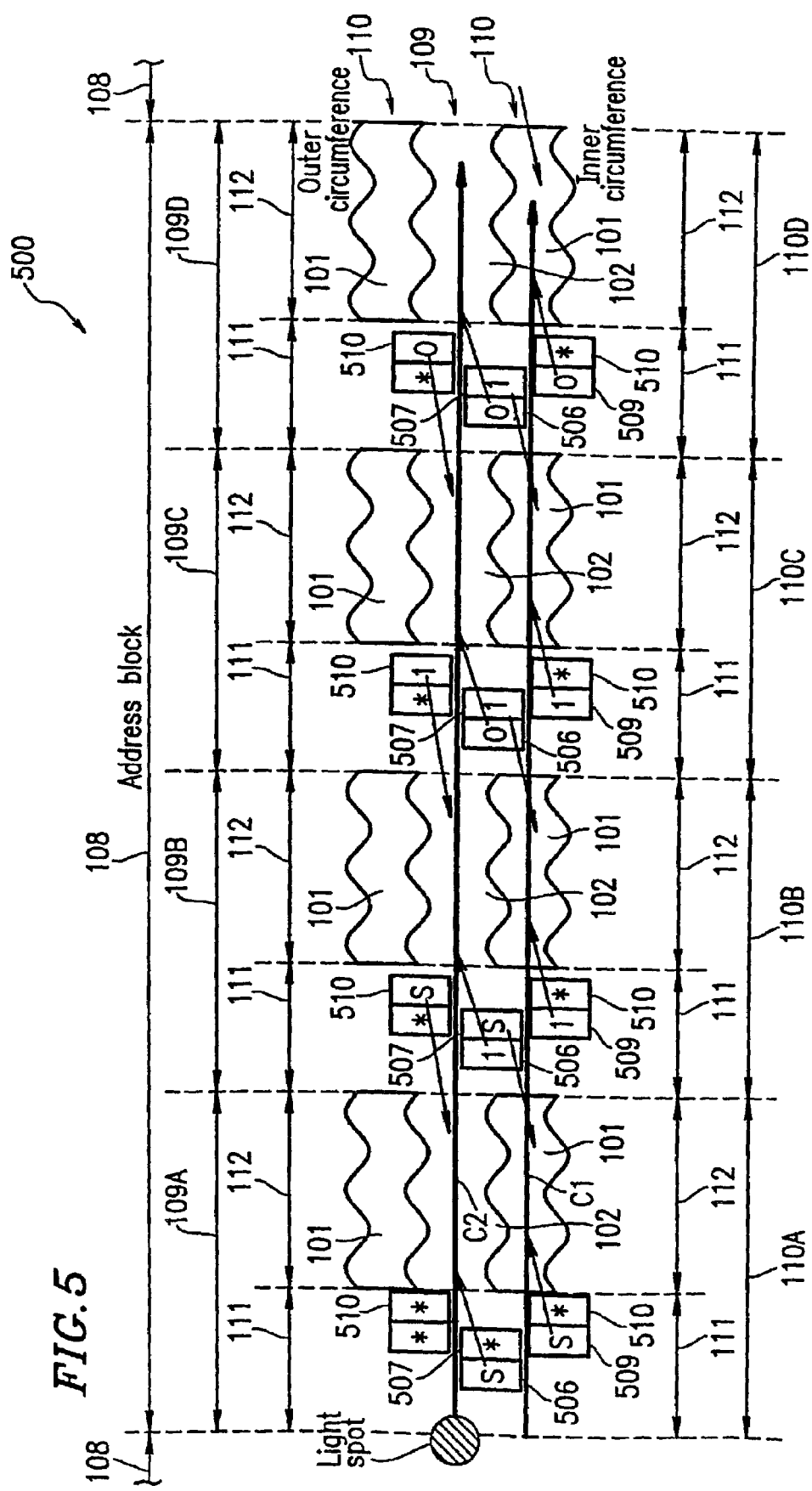
FIG. 5 is a diagram showing a structure of an optical disk according to Example 2 of the present invention.

Hereinafter, Example 2 of the present invention will be described with reference to FIG. 5. FIG. 5 is a diagram showing the structure of an optical disk according to Example 2 of the present invention. FIG. 5 shows part of the structure of a track 500 which is in the form of concentric circles or a spiral on the disk. In FIG. 5, the same components as those of the track 100 provided on the above-described optical disk of FIG. 1 are indicated by the same reference numerals as those of FIG. 1. Detailed description of such components is therefore omitted.

Referring to FIG. 5, the track 500 includes a plurality of address blocks 108. One address block 108 includes a groove sector portion 110 and a land sector portion 109. The land sector portion 109 includes a plurality of land sectors 109A, 109B, 109C, and 109D. The groove sector portion 110 includes a plurality of grove sectors 110A, 110B, 110C, and 110D. Each of the land sectors 109A, 109B, 109C, and 109D includes an identification information portion 111 and a recording and reproduction portion 112. Each of the groove sectors 110A, 110B, 110C, and 110D includes an identification information portion 111 and a recording and reproduction portion 112.

A groove track 101 is provided in the recording and reproduction portion 112 of each of the groove sectors 110A, 110B, 110C, and 110D. A land track 102 is provided in the recording and reproduction portion 112 of each of the land sectors 109A, 109B, 109C, and 109D.

In the identification information portion 111 of each of the land sectors 109A, 109B, 109C, and 109D, a first identifier 506 and a second identifier 507 are recorded at positions shifted toward the inner circumference with respect to a center line C2 of the land track 102. In the identification information portion 111 of each of the groove sectors 110A, 110B, 110C, and 110D, a third identifier 509 and a fourth identifier 510 are recorded at positions shifted toward the inner circumference with respect to a center line C1 of the groove track 101.

The first and fourth identifiers 506 and 510 recorded in the land sector portion 109 will be described. In the land sector 109A, the first identifier 506 is opposed to the fourth identifier 510 with respect to the center line C2 of the land track 102. In the first and fourth identifiers 506 and 510, the same pattern corresponding to the code "S" is provided using a prepit (or mark) and a space. In the land sector 109B, the first identifier 506 is opposed to the fourth identifier 510 with respect to the center line C2 of the land track 102. In the first and fourth identifiers 506 and 510, the same pattern corresponding to the code "1" is provided using a prepit (or mark) and a space.

In a similar manner, the first and fourth identifiers 506 and 510 are assigned to the land sectors 109C and 109D.

The third and second identifiers 509 and 507 recorded in the groove sector portion 110 will be described. In the groove sector 110A, the third identifier 509 is opposed to the second identifier 507 with respect to the center line C1 of the groove track 101. In the third and second identifiers 509 and 507, the same pattern corresponding to the code "S" is provided using a prepit (or mark) and a space. In the groove sector 110B, the third identifier 509 is opposed to the second identifier 507 with respect to the center line C1 of the groove track 101. In the third and second identifiers 509 and 507, the same pattern corresponding to the code "1" is provided using a prepit (or mark) and a space.

In a similar manner, the third and second identifiers 509 and 507 are assigned to the groove sectors 110C and 110D.

Although part of the address information of the land sector portion 109 is assigned to the first and fourth identifiers 506 and 510, and part of the address information of the groove sector portion 110 is assigned to the third and second identifiers 509 and 507. Alternatively, another combination may be available. For example, part of the address information of the land sector portion 109 may be assigned to the second and third identifiers 507 and 509, and part of the address information of the groove sector portion 110 is assigned to the first and fourth identifiers 506 and 510.

The structure of the address information is the same as described in Example 1 of the present invention shown in FIG. 2. The physical structure of the identifier is the same as described in Example 1 of the present invention shown in FIG. 3. The structure of the address block is the same as described in Example 1 of the present invention shown in FIG. 4.

As described above, two prepits (or marks) having the respective lengths P1 and P2 and one space having the length S1 are used to identify the codes in the first and second identifiers 106 and 107. In this way, the size of the header portion can be reduced to 4 bytes compared with the conventional header portion of 128 bytes. Thus, the formatted disk of the present invention has a header portion having a reduced redundancy, thereby increasing the recording capacity of the disk by a great amount.

EXAMPLE 3

Figure 6:
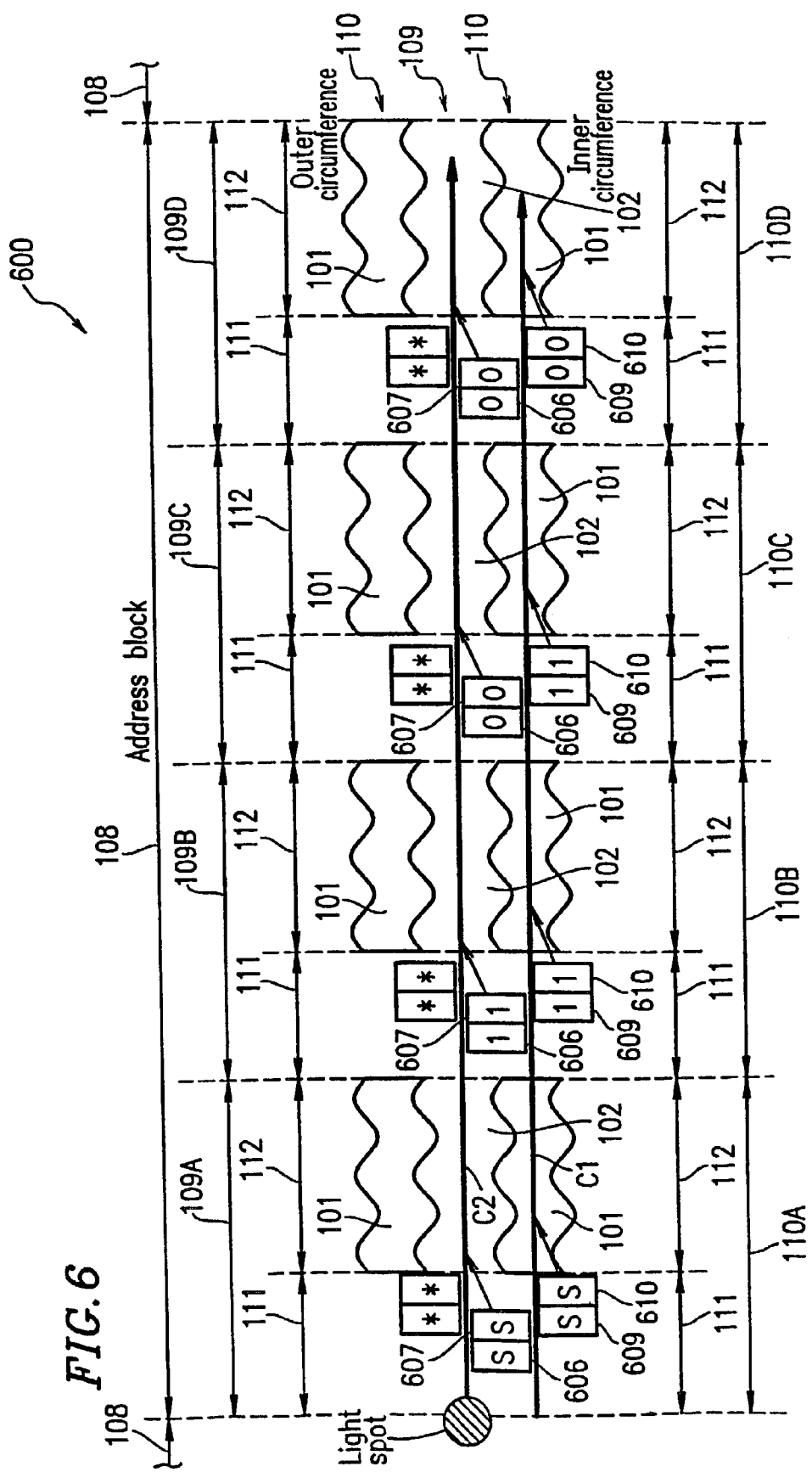
FIG. 6 is a diagram showing a structure of an optical disk according to Example 3 of the present invention.

Hereinafter, Example 3 of the present invention will be described with reference to FIG. 6. FIG. 6 is a diagram showing the structure of an optical disk according to Example 3 of the present invention. FIG. 6 shows part of the structure of a track 600 which is in the form of concentric circles or a spiral on the disk. In FIG. 6, the same components as those of the track 100 provided on the above-described optical disk of FIG. 1 are indicated by the same reference numerals as those of FIG. 1. Detailed description of such components is therefore omitted.

Referring to FIG. 6, the track 600 includes a plurality of address blocks 108. One address block 108 includes a groove sector portion 110 and a land sector portion 109. The land sector portion 109 includes a plurality of land sectors 109A, 109B, 109C, and 109D. The groove sector portion 110 includes a plurality of grove sectors 110A, 110B, 110C, and 110D. Each of the land sectors 109A, 109B, 109C, and 109D includes an identification information portion 111 and a recording and reproduction portion 112. Each of the groove sectors 110A, 110B, 110C, and 110D includes an identification information portion 111 and a recording and reproduction portion 112.

A groove track 101 is provided in the recording and reproduction portion 112 of each of the groove sectors 110A, 110B, 110C, and 110D. A land track 102 is provided in the recording and reproduction portion 112 of each of the land sectors 109A, 109B, 109C, and 109D.

In the identification information portion 111 of each of the land sectors 109A, 109B, 109C, and 109D, a first identifier 606 and a second identifier 607 are recorded at positions shifted toward the inner circumference with respect to a center line C2 of the land track 102. In the identification information portion 111 of each of the groove sectors 110A, 110B, 110C, and 110D, a third identifier 609 and a fourth identifier 610 are recorded at positions shifted toward the inner circumference with respect to a center line C1 of the groove track 101.

The first and second identifiers 606 and 607 recorded in the land sector 109 will be described. In the first identifier 606 and the second identifier 607 of the land sector 109A, the same pattern corresponding to the code "S" is provided using a prepit (or mark) and a space. In the first identifier 606 and the second identifier 607 of the land sector 109B, the same pattern corresponding to the code "1" is provided using a prepit (or mark) and a space. A first identifier 606 and a second identifier 607 are assigned to each of the land sectors 109C and 109D in a similar way as described above.

Next, the third and fourth identifiers 609 and 610 recorded in the groove sector 110 will be described. In the third and fourth identifiers 609 and 610 of the groove sector 110A, the same pattern corresponding to the code "S" is provided using a prepit (or mark) and a space. In the third and fourth identifiers 609 and 610 of the groove sector 110B, the same pattern corresponding to the code "1" is provided using a prepit (or mark) and a space. In a similar manner, the third and fourth identifiers 609 and 610 are assigned to the land sectors 110C and 110D.

Although part of the address information of the land sector portion 109 is assigned to the first and second identifiers 606 and 607, and part of the address information of the groove sector portion 110 is assigned to the third and fourth identifiers 609 and 610. Alternatively, another combination may be available. For example, part of the address information of the land sector portion 109 may be assigned to the third and fourth identifiers 609 and 610, and part of the address information of the groove sector portion 110 may be assigned to the first and fourth identifiers 606 and 607.

The structure of the address information is the same as described in Example 1 of the present invention shown in FIG. 2. The physical structure of the identifier is the same as described in Example 1 of the present invention shown in FIG. 3. The structure of the address block is the same as described in Example 1 of the present invention shown in FIG. 4.

As described above, two prepits (or marks) having the respective lengths P1 and P2 and one space having the length S1 are used to identify the codes in the identifiers recorded in the identification information portion 111. In this way, the size of the header portion can be reduced to 4 bytes compared with the conventional header portion of 128 bytes. Thus, the formatted disk of the present invention has a header portion having a reduced redundancy, thereby increasing the recording capacity of the disk by a great amount.

EXAMPLE 4

Figure 7:
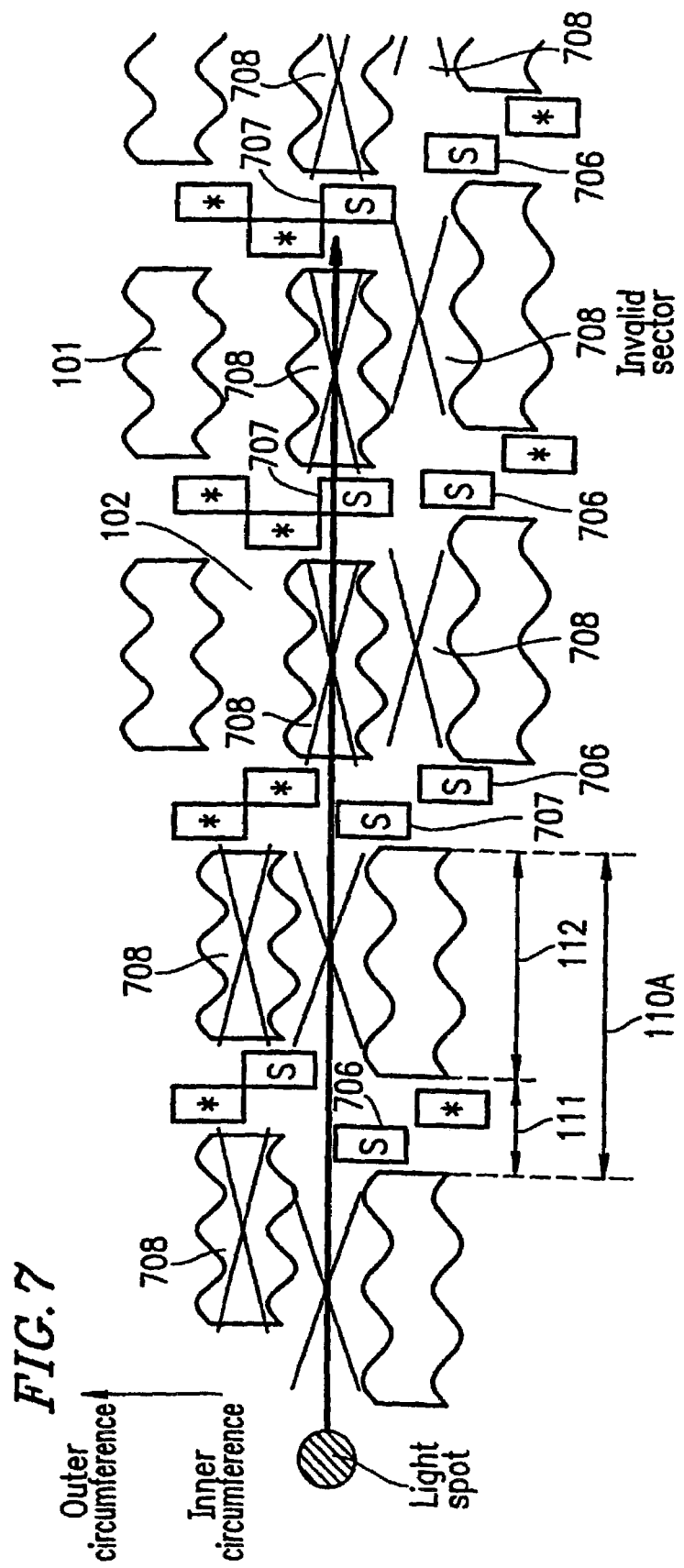
FIG. 7 is a diagram showing a structure of an optical disk according to Example 4 of the present invention.

Hereinafter, Example 4 of the present invention will be described with reference to the accompanying drawings. FIG. 7 is a diagram showing the structure of an optical disk according to Example 4 of the present invention. FIG. 7 shows a border between zones on a ZCLV (Zone CLV)-formatted disk in conformity with DVD RAM Versions. 1 and 2. In FIG. 7, the same components as those of the track 100 provided on the above-described optical disk of FIG. 1 are indicated by the same reference numerals as those of FIG. 1. Detailed description of such components is therefore omitted.

In the ZCLV disk format, the outermost land track and the innermost groove track of each zone are invalid tracks or invalid sectors at a zone border. Recording information in the recording and reproducing portion 112 is not allowed in invalid sectors.

As shown in FIG. 7, the identification codes "S" are assigned to first and second identifiers 706 and 707 of the head of an invalid sector 708 in order to identify that invalid sector. In this case, when the identification codes "S" are detected in a plurality of successive sectors, these sectors can be determined to be invalid.

As described above, when identifiers each indicating the identification code "S" are provided in a plurality of successive sectors, if the above-described sectors are determined to be invalid, recording information in the invalid sectors is prevented, thereby improving the reliability of an optical disk.

EXAMPLE 5

Figure 8:
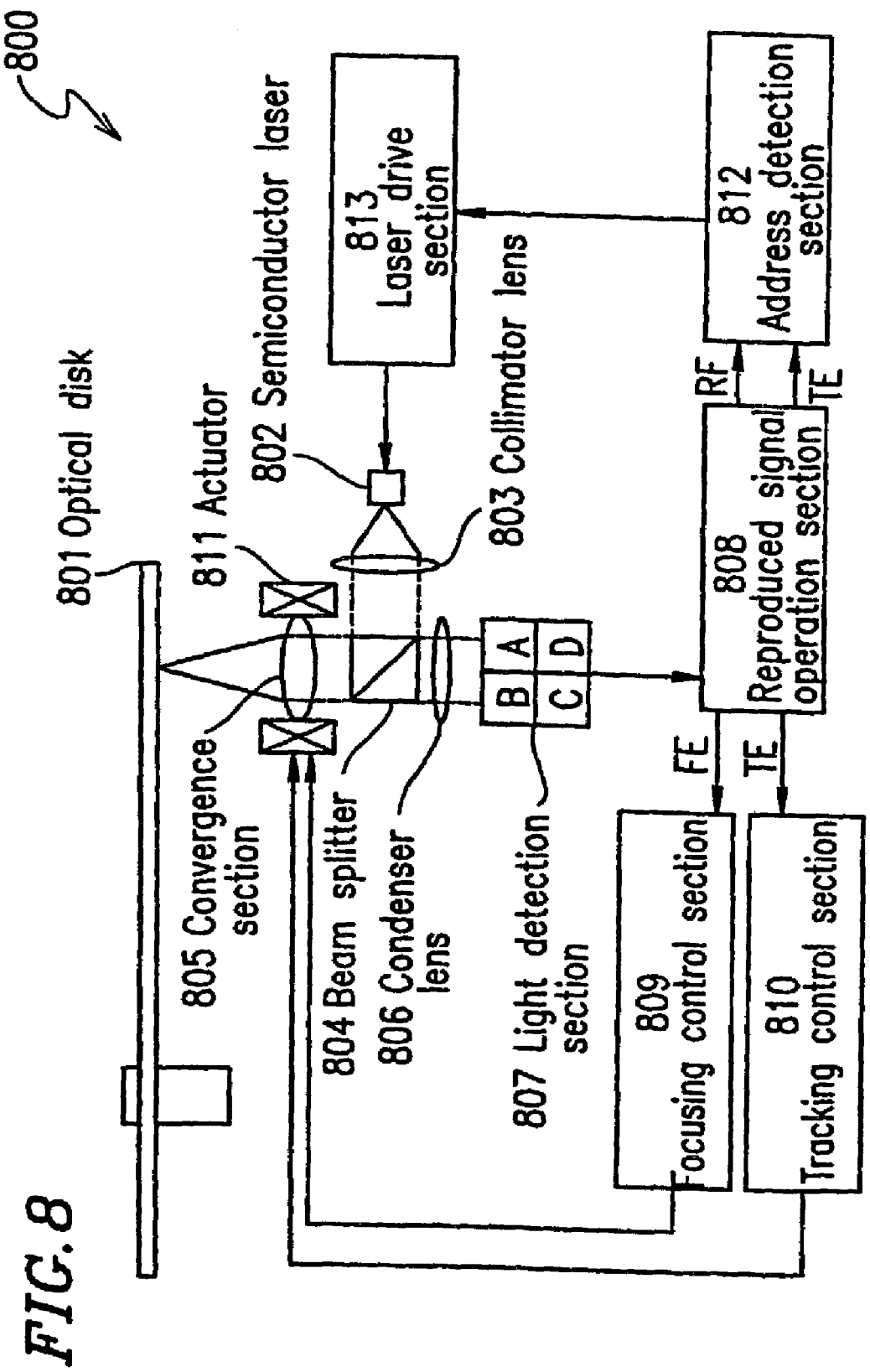
FIG. 8 is a diagram showing a structure of an optical disk apparatus according to Example 5 of the present invention.

Hereinafter, Example 5 of the present invention will be described with reference to FIG. 8. FIG. 8 is a diagram showing an optical disk apparatus 800 according to Example 5 of the present invention. The optical disk apparatus 800 includes a semiconductor laser 802, a collimator lens 803, a beam splitter 804, a convergence section 805, a condenser lens 806, a light detection section 807, a reproduced signal operation section 808, a focusing control section 809, a tracking control section 810, an actuator 811, an address detection section 812, and a laser drive section 813.

Next, a reproduction operation will be described. An optical disk 801 is, for example, the optical disk of Example 1 of the present invention. A light beam is converged into a spot which is in turn applied to the recording and reproduction portions, the identification information portions and the like of the optical disk 801 from which information is read out.

A light beam emitted from the semiconductor laser 802 is passed through the collimator lens 803 and the beam splitter 804, and then converged by the convergence section 805 onto the optical disk 801. The light spot is reflected from the optical disk 801, and the reflected light is passed through the convergence section 805 and the beam splitter 804, and then condensed by the condenser lens 806 onto the light detection section 807. The condensed light is received by light receiving elements A, B, C, and D of the light detection section 807, each of which outputs a voltage signal corresponding to an amount of the received light. The reproduced signal operation section 808 subjects the voltage signals to an arithmetic operation.

The reproduced signal operation section 808 outputs a focusing error signal FE to the focusing control section 809. The reproduced signal operation section 808 also outputs a tracking error signal TE to the tracking control section 810. The reproduced signal operation section 808 also outputs a reproduced signal RF and the tracking error signal TE to the address detection section 812.

The focusing control section 809 outputs a voltage corresponding to the focusing error signal FE which drives the actuator 811 to adjust the position of the focus of the light spot onto a surface of the optical disk 801. The tracking control section 810 outputs a voltage corresponding to the tracking error signal TE which drives the actuator 811 to bring the focus of the light spot to a desired tracking position on the surface of the optical disk 801.

Using the light spot under the focusing control and the tracking control, concave or convex prepits (or marks and spaces having different lightness due to different reflectances on a phase change optical disk) are read out to reproduce information recorded on the optical disk.

The address detection section 812 receives the output of the reproduced signal operation section 808, and detects the codes "0", "1", and "S" based on the pulse width and the pulse pattern of the reproduced signals RE and the tracking error signal TE from the identification information portions. The detected codes are temporarily stored in a memory as a part (ID) of address information on a sector-by-sector basis. When IDs for all of the sectors in an address block have been read out, an address number is calculated from the obtained IDs to recognize the address number of the address block.

EXAMPLE 6

Figure 9:
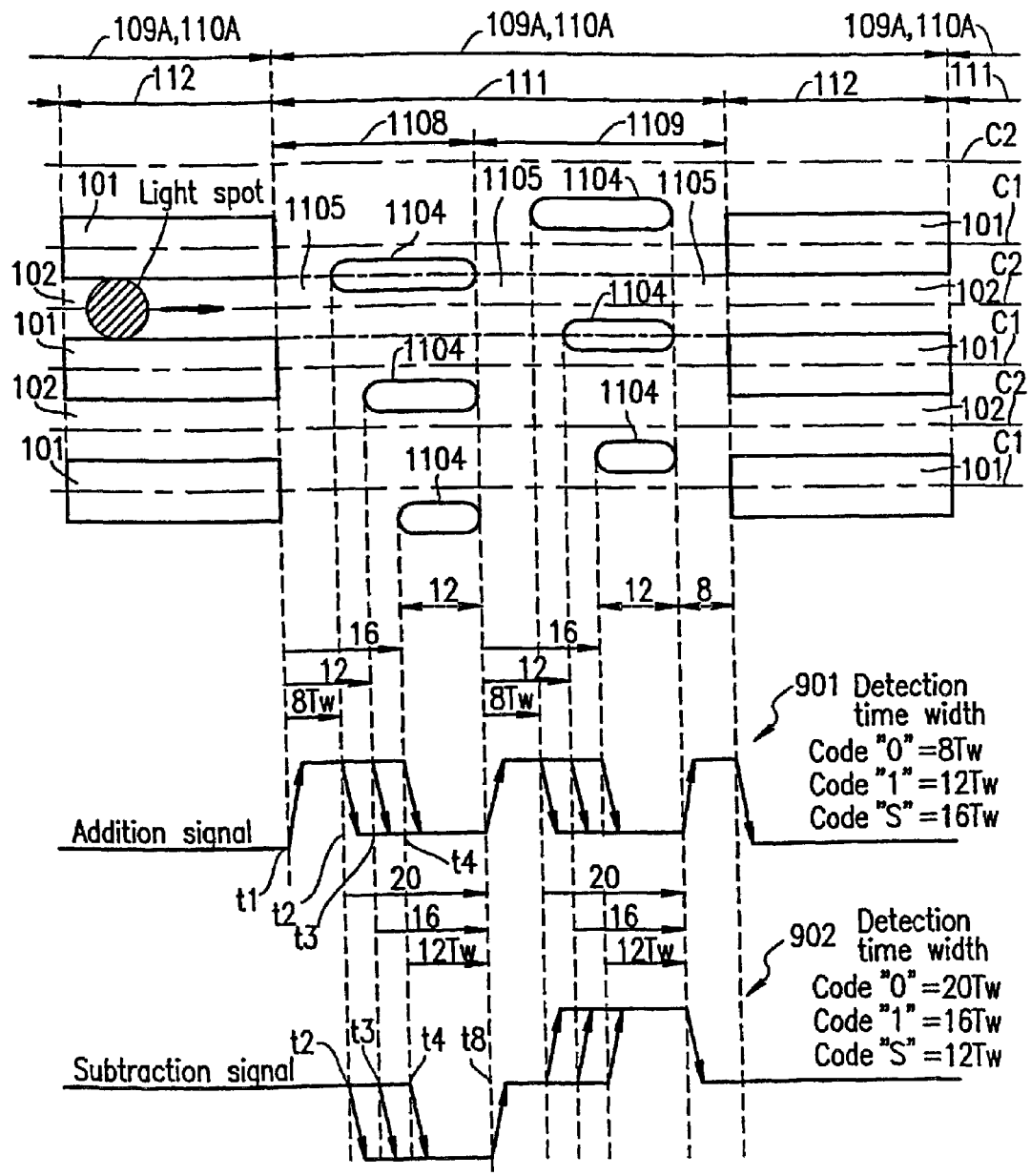
FIG. 9 is a diagram showing a structure of an optical disk according to Example 6 of the present invention.

Hereinafter, Example 6 of the present invention will be described with reference to FIG. 9. FIG. 9 is a diagram showing the structure of an optical disk according to Example 6 of the present invention. In FIG. 9, the same components as those of the track 100 provided on the above-described optical disk of FIG. 1 are indicated by the same reference numerals as those of FIG. 1. Detailed description of such components is therefore omitted.

Referring to FIG. 9, a land sector 109A includes an identification information portion 111 and a recording and reproduction portion 112. A groove sector 110A includes an identification information portion 111 and a recording reproduction portion 112.

A groove track 101 is provided in the recording reproduction portion 112 of each groove sector 110A. A land track 102 is provided in the recording reproduction portion 112 of each land sector 109A.

A first identifier 1108 is provided at a position shifted toward the inner circumference with respect to a center line C1 of the groove track 101 in the identification information portion 111 of each groove sector 110A. A second identifier 1109, is provided at a position shifted toward the inner circumference with respect to a center line C2 of the land track 102 in the identification information portion 111 of each land sector 109A.

As shown in FIG. 9, the first identifier 1108 is provided in the first half of the identification information portion 111 while the second identifier 1109 is provided in the second half of the identification information portion 111. As shown in FIG. 9, the first and second identifiers 1108 and 1109 have prepits and spaces arranged in a staggered pattern. Data is recorded in both the land track 102 and the groove track 101.

The recording and reproduction portions 112 exist in a plurality of sectors, and an identification information portion 111 is interposed between each recording and reproduction portion 112. Address information is assigned to a unit group of sectors including a plurality of land sectors or a plurality of groove sectors. One-bit information of the address information is previously recorded in the first and second identifiers 1108 and 1109. The address information of a sector is represented by combination of the first and second identifiers 1108 and 1109 of a plurality of successive sectors.

A part (one bit) of the address information of a land sector is assigned to the first identifier 1108 while a part (one bit) of the address information of a groove sector is assigned to the second identifier 1109. Alternatively, a part (one bit) of the address information of a land sector may be assigned to the second identifier 1109 while a part (one bit) of the address information of a groove sector may be assigned to the first identifier 1108.

The physical structure of the first and second identifiers 1108 and 1109 will be described. In FIG. 9, the first and second identifiers 1108 and 1109 include prepits 1104 and spaces 1105 which are disposed in a staggered pattern with respect to center lines C1 of groove tracks 101 and center lines C2 of land tracks 102. In the first and second identifiers 1108 and 1109, the length of each prepit 1104 depends on a code to be represented by that prepit. As shown in FIG. 9, the terminal edge of each prepit 1104 in the first identifier 1108 is positioned on substantially the same line. Similarly, the terminal edge of each prepit 1104 in the second identifier 1109 is positioned on substantially the same line.

Next, encoding will be described. Three different codes are defined by the different lengths of prepits 1104 and spaces 1105 which are disposed in a staggered pattern. For example, as shown in FIG. 9, a space 1105 having a length of 8Tw represents the code "0", a space 1105 having a length of 12Tw represents the code "1", and a space 1105 having a length of 16Tw represents the code "S". Alternatively, the codes may be defined by the lengths of the prepits 1104 in place of the spaces 1105. For example, a prepit 1104 having a length of 20Tw represents the code "0", a prepit 1104 having a length of 16Tw represents the code "1", and a prepit 1104 having a length of 12Tw represents the code "S". In this case, the codes "0", "1", and "S" are represented by the lengths of the spaces 1105 in ascending order. Alternatively, the codes "0", "1", and "S" are represented by the lengths of the spaces 1105 in descending order.

The code "S" indicates the head of a block address including a group of sectors. Therefore, it is preferable that the reliability of the first and second identifiers 1108 and 1109 representing the code "S" is higher than the reliability of the first and second identifiers 1108 and 1109 representing the other codes. In the case of a DVD, data is recorded in the recording and reproduction portion 112 with a 8×16-modulation method in which the maximum run of recorded data is 14Tw. Therefore, if the code "S" is represented by the length 12Tw, 16Tw, or 20Tw which are not used in the 8×16-modulation method, the first or second identifier 1108 or 1109 recorded in the identification information portion 111 can be more reliably detected.

As described above, the first and second identifier 1108 and 1109 recorded in the identification information portion 111, three different codes are defined by the different lengths of prepits 1104 and spaces 1105 which are disposed in a staggered pattern. Further, address information is distributed and recorded in a plurality of the identification information portions 111. Therefore, the size of the header portion can be reduced to 4 bytes compared with the conventional header portion of 128 bytes. Thus, the formatted disk of the present invention has a header portion having a reduced redundancy, thereby increasing the recording capacity of the disk by a great amount.

In the present invention, address information is composed of three codes including the code "S" in addition to the codes "0" and "1" Using the code "S" can clearly indicate the starting position of the address of a group of sectors, thereby improving the reliability of reading out the address information.

Next, a detection method will be described. When reproduction is conducted using an addition signal (obtained by adding signals from separate photodetectors) a reproduced waveform 901 as shown in FIG. 9 is obtained. Assuming that a first rising edge (starting point) of the waveform 901 is time t1, a period of time from time t1 to time t2, t3, or t4 corresponding to a next falling edge is measured to detect a code. As shown in FIG. 9, the code is: "0" when the detected time width is 8Tw; "1" when the detected time width is 12Tw; and "S" when the detected time width is 16Tw.

When reproduction is conducted using a subtraction signal (obtained by subtracting between signals from separate photodetectors arranged along a tracking direction), a reproduced waveform 902 as shown in FIG. 9 is obtained. Assuming that a first falling edge (starting point) of the waveform 902 is time t2, t3, or t4, a period of time from time t2, t3, or t4 to time t8 corresponding to a next rising edge is measured to detect a code. As shown in FIG. 9, the code is: "0" when the detected time width is 20Tw; "1" when the detected time width is 16Tw; and "S" when the detected time width is 12Tw.

In the case of the subtraction signal, the reproduced waveform 902 corresponding to the first identifier 1108 is symmetrical to the reproduced waveform 902 corresponding to the second identifier 1109 with respect to the 0 level, since the prepits are arranged in a staggered pattern. The starting point of a reproduced waveform is a falling edge in the first identifier 1108. Conversely, the starting point of a reproduced waveform is a rising edge in the second identifier 1109.

EXAMPLE 7

Hereinafter, Example 7 of the present invention will be described with reference to FIG. 10. FIG. 10 is a diagram showing the structure of an optical disk according to Example 7 of the present invention. In FIG. 10, the same components as those of the track 100 provided on the above-described optical disk of FIG. 1 are indicated by the same reference numerals as those of FIG. 1. Detailed description of such components is therefore omitted.

Referring to FIG. 10, a land sector 109A includes an identification information portion 111 and a recording and reproduction portion 112. A groove sector 110A includes an identification information portion 111 and a recording reproduction portion 112.

A groove track 101 is provided in the recording reproduction portion 112 of each groove sector 110A. A land track 102 is provided in the recording reproduction portion 112 of each land sector 109A.

A first identifier 1208 is provided at a position shifted toward the inner circumference with respect to a center line C1 of the groove track 101 in the identification information portion 111 of each groove sector 110A. A second identifier 1209 is provided at a position shifted toward the inner circumference with respect to a center line C2 of the land track 102 in the identification information portion 111 of each land sector 109A.

As shown in FIG. 10, the first identifier 1208 is provided in the first half of the identification information portion 111 while the second identifier 1209 is provided in the second half of the identification information portion 111. As shown in FIG. 10, the first and second identifiers 1208 and 1209 have prepits and spaces arranged in a staggered pattern. Data is recorded in both the land track 102 and the groove track 101.

The recording and reproduction portions 112 exist in a plurality of sectors, and an identification information portion 111 is interposed between each recording and reproduction portion 112. Address information is assigned to a unit group of sectors including a plurality of land sectors or a plurality of groove sectors. One-bit information of the address information is previously recorded in the first and second identifiers 1208 and 1209. The address information of a sector is represented by combination of the first and second identifiers 1208 and 1209 of a plurality of successive sectors.

A part (one bit) of the address information of a land sector is assigned to the first identifier 1208 while a part (one bit) of the address information of a groove sector is assigned to the second identifier 1209. Alternatively, a part (one bit) of the address information of a land sector may be assigned to the second identifier 1209 while a part (one bit) of the address information of a groove sector may be assigned to the first identifier 1208.

The physical structure of the first and second identifiers 1208 and 1209 will be described. In FIG. 10, the first and second identifiers 1208 and 1209 include prepits 1204 and spaces 1205 which are disposed in a staggered pattern with respect to center lines C1 of groove tracks 101 and center lines C2 of land tracks 102. In the first and second identifiers 1208 and 1209, the length of each prepit 1204 depends on a code to be represented by that prepit. As shown in FIG. 10, the starting edge of each prepit 1204 in the first identifier 1208 is positioned on substantially the same line. Similarly, the starting edge of each prepit 1204 in the second identifier 1209 is positioned on substantially the same line.

Next, encoding will be described. Three different codes are defined by the different lengths of prepits 1204 and 1205 which are disposed in a staggered pattern. For example, as shown in FIG. 10, a prepit 1204 having a length of 12Tw represents the code "0", a prepit 1204 having a length of 16Tw represents the code "1", and a prepit 1204 having a length of 20Tw represents the code "S". Alternatively, the codes may be defined by the different lengths of the space 1205 in place of the prepits 1204. For example, a space 1205 having a length of 20Tw represents the code "0", a space 1205 having a length of 16Tw represents the code "1", and a space 1205 having a length of 12Tw represents the code "S". In this case, the codes "0", "1", and "S" are represented by the lengths of the prepits 1204 in ascending order. Alternatively, the codes "0", "1", and "S" may be represented by the lengths of the prepits 1204 in descending order.

The code "S" indicates the head of a block address including a group of sectors. Therefore, it is preferable that the reliability of the first and second identifiers 1208 and 1209 representing the code "S" is higher than the reliability of the first and second identifiers 1208 and 1209 representing the other codes. In the case of a DVD, data is recorded in the recording and reproduction portion 112 with a 8×16-modulation method in which the maximum run of recorded data is 14Tw. Therefore, if the code "S" is represented by the length 12Tw, 16Tw, or 20Tw which are not used in the 8×16-modulation method, the first or second identifier 1208 or 1209 recorded in the identification information portion 111 can be detected more reliably.

As described above, the first and second identifier 1208 and 1209 recorded in the identification information portion 111, three different codes are defined by the different lengths of prepits 1204 and spaces 1205 which are disposed in a staggered pattern. Further, address information is distributed and recorded in a plurality of the identification information portions 111. Therefore, the size of the header portion can be reduced to 4 bytes compared with the conventional header portion of 128 bytes. Thus, the formatted disk of the present invention has a header portion having a reduced redundancy, thereby increasing the recording capacity of the disk by a great amount.

In the present invention, address information is composed of the three codes including the code "S" in addition to the codes "0" and "1". Using the code "S" can clearly indicate the starting position of the address of a group of sectors, thereby improving the reliability of reading out the address information.

Next, a detection method will be described. When reproduction is conducted using an addition signal (obtained by adding signals from separate photodetectors), a reproduced waveform 1001 as shown in FIG. 10 is obtained. Assuming that a first falling edge (starting point) of the waveform 1001 is time t11, a period of time from time t11 to time t12, t13, or t14 corresponding to a next rising edge is measured to detect a code. As shown in FIG. 10, the code is: "0" when the detected time width is 12Tw; "1" when the detected time width is 16Tw; and "S" when the detected time width is 20Tw.

When reproduction is conducted using a subtraction signal (obtained by subtracting between signals from separate photodetectors arranged along a tracking direction), a reproduced waveform 1002 as shown in FIG. 10 is obtained. Assuming that a first falling edge (starting point) of the waveform 1002 is time t11, a period of time from time t11 to t12, t13, or t14 corresponding to a next rising edge is measured to detect a code. As shown in FIG. 10, the code is: "0" when the detected time width is 12Tw; "1" when the detected time width is 16Tw; and "S" when the detected time width is 20Tw.

In the case of the subtraction signal, the reproduced waveform 1002 corresponding to the first identifier 1208 is symmetrical to the reproduced waveform 1002 corresponding to the second identifier 1209 with respect to the 0 level, since the prepits are arranged in a staggered pattern. The starting point of a reproduced waveform is a falling edge in the first identifier 1208. Conversely, the starting point of a reproduced waveform is a rising edge in the second identifier 1209.

EXAMPLE 8

Hereinafter, Example 8 of the present invention will be described with reference to FIGS. 11A and 11B. FIG. 11A is a diagram showing an optical disk according to Example 8 of the present invention. The same components as those of the track 100 provided on the above-described optical disk of FIG. 1 are indicated by the same reference numerals as those of FIG. 1. Detailed description of such components is therefore omitted.

FIG. 11A shows the structure of address information for a unit of user data recorded in a recording and reproduction portion 112, the size of the unit being 2 KB. The address information is distributed and recorded in a plurality of sectors 109A, 109B, 109C, ..., 109D. One-bit information in the address information is assigned to the identification information portion 111 of the head of each of the sectors 109A, 109B, 109C, ..., 109D. A unit of address information is an address block 108. An address block 108 corresponds to an ECC block unit, for example.

In the case of FIG. 11A, one ECC block unit includes 32 sectors, and has a user recording capacity of 2 KB×32 (=64 KB). Every 64 KB user data is assigned a continuous address number. The address number is increased by one every 64 KB and assigned to an address block from the inner circumference side to the outer circumference side.

FIG. 11B is a diagram used for explaining the content of address information. A description will be given of a case when an optical disk has a single information surface (a single layer) on which information is recorded. One address number is composed of 32 address bits recorded respectively in the 32 sectors of one ECC block unit. As shown in FIG. 11B, the head of an address block contains an identification code "S" indicating the beginning of an address number. The following 19 bits are information bits which represent an actual address number. The following 12 bits are parity bits for the address number. In this way, an address space of (2 to the power of 19)×64 KB (=32 GB) can be provided.

Next, an optical disk having two information surfaces (two layers) on which information is recorded will be described. One address number is composed of 32 address bits recorded respectively in the 32 sectors of one ECC block unit. Continuous address numbers are assigned to address blocks from the inner circumference side to the outer circumference side of the first recording layer of the two-layer-disk. Similarly, continuous address numbers are assigned to address blocks from the inner circumference side to the outer circumference side of the second recording layer of the two-layer disk. In this case, the starting address number for the second layer may be a serial number continued from the final address number for the first layer. Alternatively, the address numbers for the second layer may be newly numbered from the inner circumference side.

As shown in FIG. 11B, the head of an address block contains an identification code "S" indicating the beginning of an address number. The following 20 bits are information bits which represent an actual address number. The following 10 bits are parity bits for the address number. The remaining one bit is a layer number representing the number of a recording layer. In this way, an address space of (2 to the power of 20)×64 KB (=64 GB) can be provided.

Further, the following effects are obtained by including the layer number in address information. Using the layer number, it is possible to determine in real time a recording layer on which a light spot is focused. Which recording layer the light spot is focused on can be determined by reading a layer number at the time of reading out an address number (every 64 KB). Therefore, an accidental jump of focus from one layer to another, or an irregular focus jump can be quickly detected, thereby making it possible to quickly address such situations.

Further, in the case of a two-layer disk, the lengths of prepits or spaces as shown in FIGS. 9 and 10 of Examples 6 and 7 may be changed between the first and second layers. For example, the first layer has the structure of the optical disk shown in FIG. 9 while the second layer has prepits each having a length elongated by 2Tw (i.e., the length of a prepit corresponding to the code "0" is 22Tw, the length of a prepit corresponding to the code "1" is 18Tw, and the length of a prepit corresponding to the code "S" is 14Tw). In this case, the prepits in the first and second layers corresponding to the same code have different detection time widths, thereby preventing erroneous detection of the recording layers.

All types of codes may not have different detection time widths between the first and second layers. Only the prepit or space representing the code "S" may have different lengths between the first and second layers. Only the pattern representing the code "S" may be different between the first and second layers.

Figure 12:
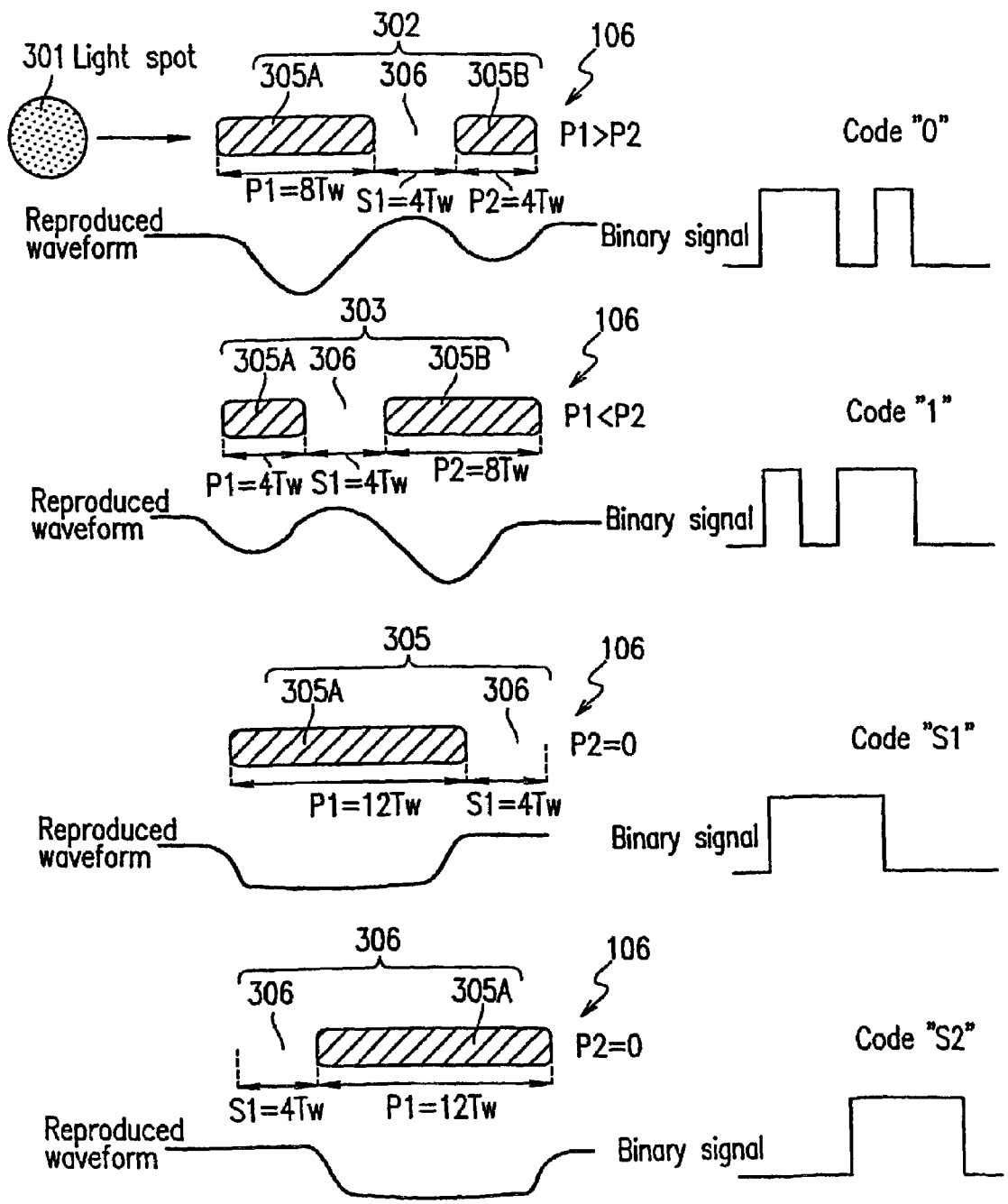
FIG. 12 is a diagram used for explaining a physical structure of ID of the optical disk according to Example 8 of the present invention.
Figure 13:
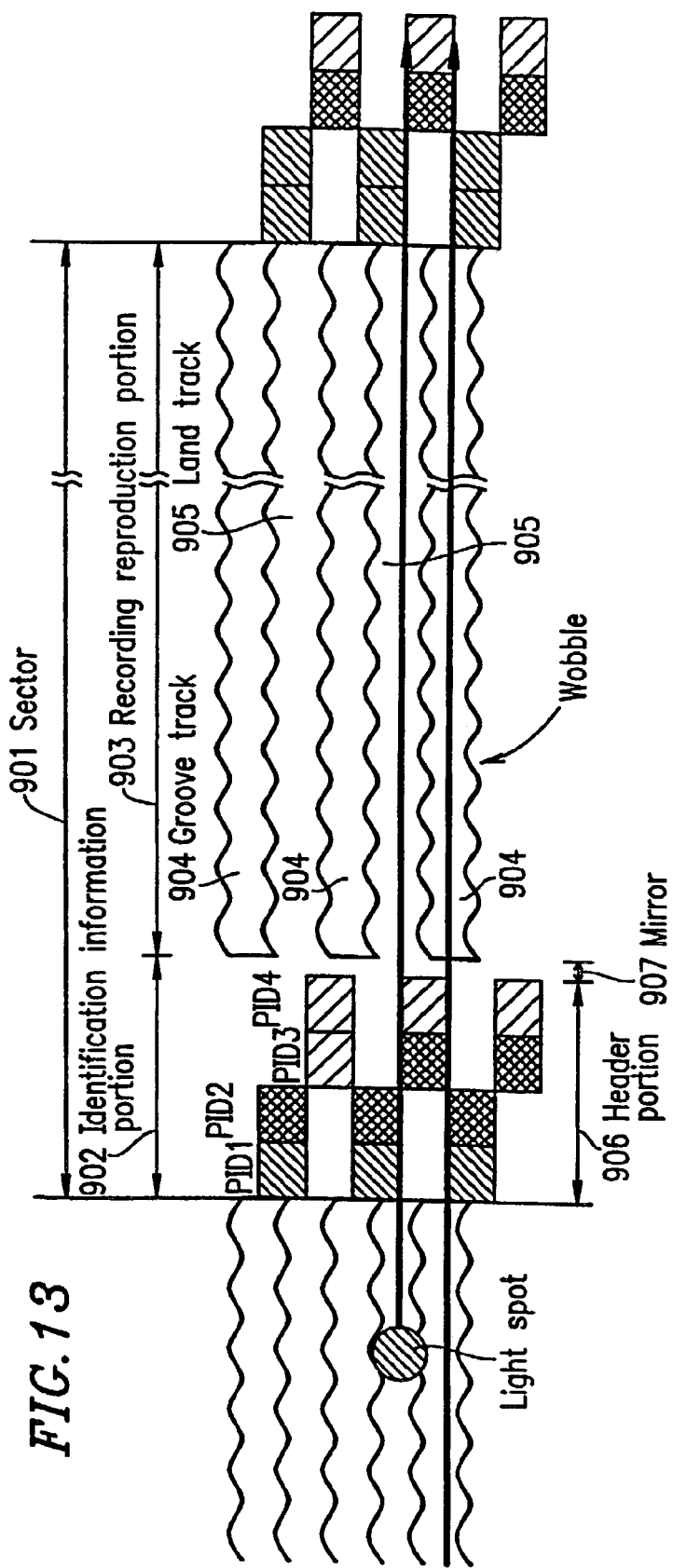
FIG. 13 is a diagram showing a structure of a conventional optical disk.
Figure 14:
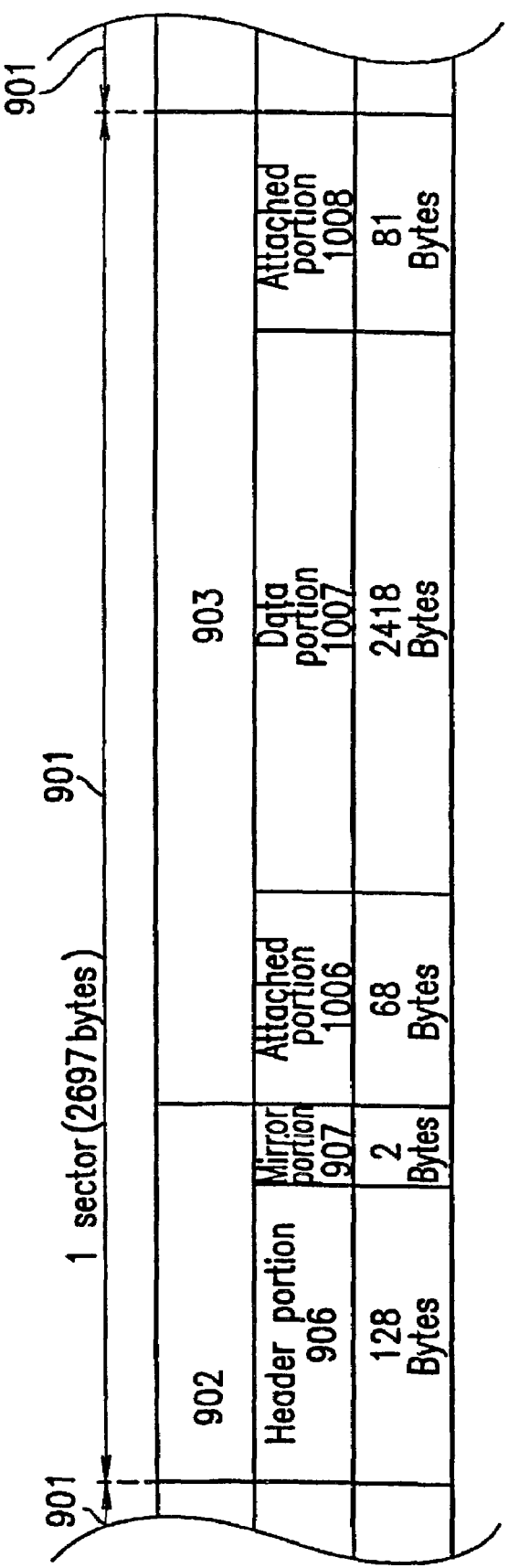
FIG. 14 is a diagram showing a structure of a sector of a conventional optical disk.

Referring to FIG. 12, for example, the pattern representing the code "S" is different between the first and second layers. The code "S" is a code "S1" in the first layer while the code "S" is a code "S2" in the second layer. As shown in FIG. 12, the code "S1" is represented by a pattern 305 including a prepit 305A and a space 306 disposed immediately after the prepit 305A. The prepit 305A has a length of P1. The length P1 is 12 times as long as a detection window width Tw. The space 306 has a length of S1. The length S1 is 4 times as long as the detection window width Tw. The code "S2" is represented by a pattern 306 including a space 306 and a prepit 305A disposed immediately after the space 306. The space 306 has a length of S1. The length S1 is 4 times as long as the detection window width Tw. The prepit 305A has a length of P1. The length P1 is 12 times as long as a detection window width Tw. The code "S1" is recorded in the first layer while the code "S2" is recorded in the second layer.

When the code "S" is represented by different patterns between the first and second layers in the above-described manner, the recording layer can be quickly identified upon reading the identification code "S" in the head of an address block. Therefore, an accidental jump of focus from one layer to another, or an irregular focus jump can be quickly detected, thereby making it possible to quickly address such situations.

INDUSTRIAL APPLICABILITY

As described above, two prepits (or marks) having the respective lengths P1 and P2 and one space having the length S1 are used to represent identifier codes. Thus, the size of a header portion can be reduced to 4 bytes compared with a conventional header portion of 128 bytes. Thus, the formatted disk of the present invention has a header portion having a reduced redundancy, thereby increasing the recording capacity of the disk by a great amount.

Further, according to the optical recording medium of the present invention, address information is composed of three codes including the code "S" in addition to the codes "0" and "1". Using the code "S" can clearly indicate the starting position of the address of a group of sectors, thereby improving the reliability of reading out the address information.

What is claimed is:

1. An optical recording medium comprising a plurality of identifiers in association with address information, wherein:
   each identifier is provided on the optical recording medium; and
   each identifier comprises at least one of:
   a first pattern provided on the optical recording medium and representing a first code expressed by one bit;
   a second pattern provided on the optical recording medium and representing a second code expressed by one bit; and
   a third pattern provided on the optical recording medium and representing a third code expressed by one bit,
   wherein one of the first pattern, the second pattern, and the third pattern corresponds to a starting position of an address of each of a plurality of sectors.

2. An optical recording medium according to claim 1, wherein the first code includes "0", the second code includes "1", and the third code includes "S" representing a synchronization mark.

3. An optical recording medium according to claim 1, wherein each identifier includes one or more prepits or marks provided on the optical recording medium and/or one or more spaces provided on the optical recording medium.

4. An optical recording medium according to claim 1, wherein:
   the first, second, and third patterns each have a first prepit provided on the optical recording medium;
   the first and second patterns each further have a second prepit and a first space between the first and second prepits, the first and second prepits and the first space being provided on the optical recording medium;
   the first prepit has a length of P1, and the second prepit has a length of P2;
   P1>P2 is established in the first pattern; and
   P1<P2 is established in the second pattern.

5. An optical recording medium according to claim 4, wherein:
   the first space has a length of S1;
   P1=8×Tw, S1=4×Tw, and P2=4×Tw are established in the first pattern;
   P1=4×Tw, S1=4×Tw, and P2=8×Tw are established in the second pattern; and
   P1=16×Tw is established in the third pattern, where Tw is a detection window width.

6. An optical recording medium according to claim 4, wherein:
   the third pattern includes:
   a fourth pattern including the first prepit and a second space disposed immediately after the first prepit, the second space being provided on the optical recording medium; and
   a fifth pattern including the first prepit and the second space disposed immediately before the first prepit.

7. An optical recording medium according to claim 6, wherein:
   the second space has a length of S2; and
   P1=12×Tw and S2=4×Tw are established in the fourth and fifth patterns, where Tw is a detection window width.

8. An optical recording medium according to claim 6, wherein:
   the optical recording medium includes first and second information surfaces;
   the third code includes a code "S1" representing a first synchronization mark and recorded on the first information surface, and a code "S2" representing a second synchronization mark and recorded on the second information surface;
   the fourth pattern represents the code "S1"; and
   the fifth pattern represents the code "S2".

9. An optical recording medium according to claim 1, wherein:
   the first, second, end third patterns each have a first space provided on the optical recording medium;
   the first and second patterns each have a second space and a prepit between the first and second spaces, the second space and the prepit being provided on the optical recording medium;
   the first space has a length of P1, and the second space has a length of P2;

P1>P2 is established in the first pattern; and
P1<P2 is established in the second pattern.

10. An optical recording medium according to claim 9, wherein:
the prepit has a length of S1;
P1=8×Tw, S1=4×Tw, and P2=4×Tw are established in the first pattern;
P1=4×Tw, S1=4×Tw, and P2=8×Tw are established in the second pattern; and
P1=16×Tw is established in the third pattern,
where Tw is a detection window width.

11. An optical recording medium according to claim 1, wherein:
the first, second, and third patterns each have a length of T1;
the first pattern includes a first space and a first prepit disposed immediately after the first space, the first space and the first prepit being provided on the optical recording medium;
the second pattern includes a second space and a second prepit disposed immediately after the second space, the second space and the second prepit being provided on the optical recording medium;
the third pattern includes a third space and a third prepit disposed immediately after the third space, the third space and the third prepit being provided on the optical recording medium; and
the first, second, and third spaces have respective lengths of P1, P2, and P3 being different from one another.

12. An optical recording medium according to claim 11, wherein:
the length T1 is equal to 24×Tw;
the length P1 of the first space is equal to 8×Tw;
the length P2 of the second space is equal to 12×Tw; and
the length P3 of the third space is equal to 16×Tw,
where Tw is a detection window width.

13. An optical recording medium according to claim 1, wherein:
the first, second, and third patterns each have a length of T1;
the first pattern includes a first prepit and a first space disposed immediately after the first prepit, the first prepit and the first space being provided on the optical recording medium;
the second pattern includes a second prepit and a second space disposed immediately after the second prepit, the second prepit and the second space being provided on the optical recording medium;
the third pattern includes a third prepit and a third space disposed immediately after the third prepit, the third prepit and the third space being provided on the optical recording medium; and
the first, second, and third prepits have respective lengths of P1, P2, and P3 being different from one another.

14. An optical recording medium according to claim 13, wherein:
the length T1 is equal to 24×Tw;
the length P1 of the first prepit is equal to 12×Tw;
the length P2 of the second prepit is equal to 16×Tw; and
the length P3 of the third prepit is equal to 20×Tw,
where Tw is a detection window width.

15. An optical recording medium according to claim 1, wherein
the optical recording medium includes an address block including a plurality of sectors in association with the address information;
each sector includes an identification information portion and a recording and reproduction portion;
the identification information portion includes a header portion; and
one of the plurality of identifiers is provided in the header portion.

16. An optical recording medium according to claim 15, wherein:
the address information represents an address of the address block;
the address information is recorded in the address block; and
the address information is represented by a combination of the first, second, and third codes.

17. An optical recording medium according to claim 15, wherein at least one header portion includes some of the plurality of identifiers.

18. An optical recording medium according to claim 15, wherein:
the optical recording medium includes a plurality of zones having different numbers of identification information portions provided in a track round;
some of a plurality of sectors positioned at a border between each zone are invalid regions, and information is not allowed to be recorded in said some of the plurality of sectors; and
one of the plurality of identifiers provided in one of the identification information portions of each of said some of the plurality of sectors existing in the invalid region includes the third pattern representing the third code.

19. An optical recording medium according to claim 15, wherein:
the optical recording medium has a land and a groove, and the land and the groove are in a form of concentric circles or a continuous spiral;
information is recorded in the land and/or the groove; and
each sector includes a land sector provided in the land and a groove sector provided in the groove.

20. An optical recording medium according to claim 19, wherein:
the land and the groove have a land track center line and a groove track center line, respectively;
each identifier is disposed a predetermined distance from the land track center line or the groove track center line toward an inner or outer circumference side of the optical recording medium;
any two of the plurality of identifiers are not symmetrical to each other with respect to the land track center line; and
any two of the plurality of identifiers are not symmetrical to each other with respect to the groove track center line.

21. An optical recording medium according to claim 20, wherein one of the plurality of identifiers provided at the inner circumference side with respect to the groove track center line is identical to another of the plurality of identifiers provided at the outer circumference side with respect to the groove track center line.

22. An optical recording medium according to claim 20, wherein one of the plurality of identifiers provided at the inner circumference side with respect to the land track center line is identical to another of the plurality of identifiers provided at the outer circumference side with respect to the land track center line.

23. An optical recording medium according to claim 1, wherein the address information includes a parity bit.

24. An optical recording medium according to claim 1, wherein the optical recording medium includes a plurality of information surfaces, and the address information includes a layer number for identifying each of the plurality of information surfaces.

25. An optical reproduction apparatus for reproducing information recorded in an optical recording medium comprising a plurality of identifiers in association with address information, wherein:

each identifier is provided on the optical recording medium; and each identifier comprises at least one of:

a first pattern provided on the optical recording medium and representing a first code expressed by one bit;

a second pattern provided on the optical recording medium and representing a second code expressed by one bit; and a third pattern provided on the optical recording medium and representing a third code expressed by one bit, wherein one of the first pattern, the second pattern, and the third pattern corresponds to a starting position of an address of each of a plurality of sectors, the apparatus comprising:

a semiconductor laser for applying a light spot obtained by converging a light beam onto the optical recording medium;

a light detection section for receiving the light beam reflected from the optical recording medium, and outputting a voltage signal corresponding to an amount of the reflected light beam; and an address detection section for detecting the address information based on the voltage signal output from the light detection section.

26. An optical reproduction method for reproducing information recorded in an optical recording medium comprising a plurality of identifiers in association with address information, wherein:

each identifier is provided on the optical recording medium; and each identifier comprises at least one of:

a first pattern provided on the optical recording medium and representing a first code expressed by one bit;

a second pattern provided on the optical recording medium and representing a second code expressed by one bit; and a third pattern provided on the optical recording medium and representing a third code expressed by one bit, wherein one of the first pattern, the second pattern, and the third pattern corresponds to a starting position of an address of each of a plurality of sectors, the method comprising the steps of:

applying a light spot obtained by converging a light beam onto the optical recording medium;

receiving the light beam reflected from the optical recording medium, and outputting a voltage signal corresponding to an amount of the reflected light beam; and detecting the address information based on the voltage signal output from the light detection section.

* * * * *

UNITED STATES PATENT AND TRADEMARK OFFICE
CERTIFICATE OF CORRECTION

| | | |
|---|---|---|
| PATENT NO. | : 6,996,053 B2 | Page 1 of 1 |
| APPLICATION NO. | : 10/181754 | |
| DATED | : February 7, 2006 | |
| INVENTOR(S) | : Atsushi Nakamura et al. | |

It is certified that error appears in the above-identified patent and that said Letters Patent is hereby corrected as shown below:

Title Page, item (74), "Boiselle" should read -- Boisselle --.

Column 20, line 60, "end" should read -- and --.

Signed and Sealed this

Twenty-first Day of November, 2006

JON W. DUDAS
*Director of the United States Patent and Trademark Office*